US012400652B1

(12) United States Patent
Fan et al.

(10) Patent No.: US 12,400,652 B1
(45) Date of Patent: Aug. 26, 2025

(54) NATURAL LANGUAGE PROCESSING SYSTEM

(71) Applicant: Amazon Technologies, Inc., Seattle, WA (US)

(72) Inventors: Xing Fan, Redmond, WA (US); Narendra Gyanchandani, Sammamish, WA (US); Puyang Xu, Issaquah, WA (US); Chenlei Guo, Redmond, WA (US); Shubham Katiyar, Bothell, WA (US); Gokhan Tur, Los Altos, CA (US); Xinhong Zhang, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 18/216,276

(22) Filed: Jun. 29, 2023

(51) Int. Cl.
*G10L 15/22* (2006.01)
*G10L 15/18* (2013.01)
*G10L 15/183* (2013.01)

(52) U.S. Cl.
CPC .......... *G10L 15/22* (2013.01); *G10L 15/1822* (2013.01); *G10L 15/183* (2013.01); *G10L 2015/223* (2013.01)

(58) Field of Classification Search
USPC ...................................................... 704/1–504
See application file for complete search history.

(56) References Cited

U.S. PATENT DOCUMENTS

| | | | |
|---|---|---|---|
| 10,909,325 B2* | 2/2021 | Sarikaya | G10L 15/063 |
| 11,886,542 B2* | 1/2024 | Bellegarda | G06N 3/045 |
| 11,914,848 B2* | 2/2024 | Blatz | G06F 3/0485 |
| 12,039,975 B2* | 7/2024 | Krishnan | G10L 15/20 |
| 12,105,785 B2* | 10/2024 | Maizels | G06V 40/171 |
| 12,130,901 B2* | 10/2024 | Wexler | G06V 40/70 |
| 12,197,712 B2* | 1/2025 | Blatz | G06F 3/04886 |
| 2017/0364505 A1* | 12/2017 | Sarikaya | G10L 15/22 |
| 2022/0093094 A1* | 3/2022 | Krishnan | G06V 10/40 |
| 2022/0383044 A1* | 12/2022 | Bellegarda | G06N 3/08 |
| 2023/0135179 A1* | 5/2023 | Mielke | G06N 5/022 704/232 |
| 2023/0215425 A1* | 7/2023 | Sarikaya | G06F 16/3329 704/275 |
| 2024/0070251 A1* | 2/2024 | Maizels | G10L 13/02 |
| 2024/0079011 A1* | 3/2024 | Maizels | G06V 40/166 |
| 2024/0079012 A1* | 3/2024 | Maizels | G06V 40/166 |
| 2024/0087361 A1* | 3/2024 | Wexler | G06V 40/172 |
| 2024/0095987 A1* | 3/2024 | Piramuthu | G10L 15/18 |

(Continued)

*Primary Examiner* — Marcus T Riley
(74) *Attorney, Agent, or Firm* — Pierce Atwood LLP

(57) ABSTRACT

Techniques for processing with respect to a user input as contextual information is available are described. A system generates a first task prediction using first context data that is available when a user input is received. The system generates a second task prediction (e.g., updated first task prediction) when second context data is received, and then further generates a third task prediction when third context data is received. Example first context data may include device type information, time information, location, etc. Example second context data may include automatic speech recognition (ASR) data. Example third context data may include natural language understanding (NLU) data. Using the third task prediction, the system generates an output responsive to the user input.

20 Claims, 9 Drawing Sheets

(56) References Cited

U.S. PATENT DOCUMENTS

| | | | |
|---|---|---|---|
| 2024/0096328 A1* | 3/2024 | Wexler | A61B 5/0064 |
| 2024/0119937 A1* | 4/2024 | Wexler | G06V 20/50 |
| 2024/0119938 A1* | 4/2024 | Wexler | G10L 13/02 |
| 2024/0127817 A1* | 4/2024 | Wexler | G06F 40/40 |
| 2025/0028808 A1* | 1/2025 | Maizels | A61B 5/1176 |
| 2025/0111192 A1* | 4/2025 | Bayless | G06N 3/006 |

\* cited by examiner

NATURAL LANGUAGE PROCESSING SYSTEM

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
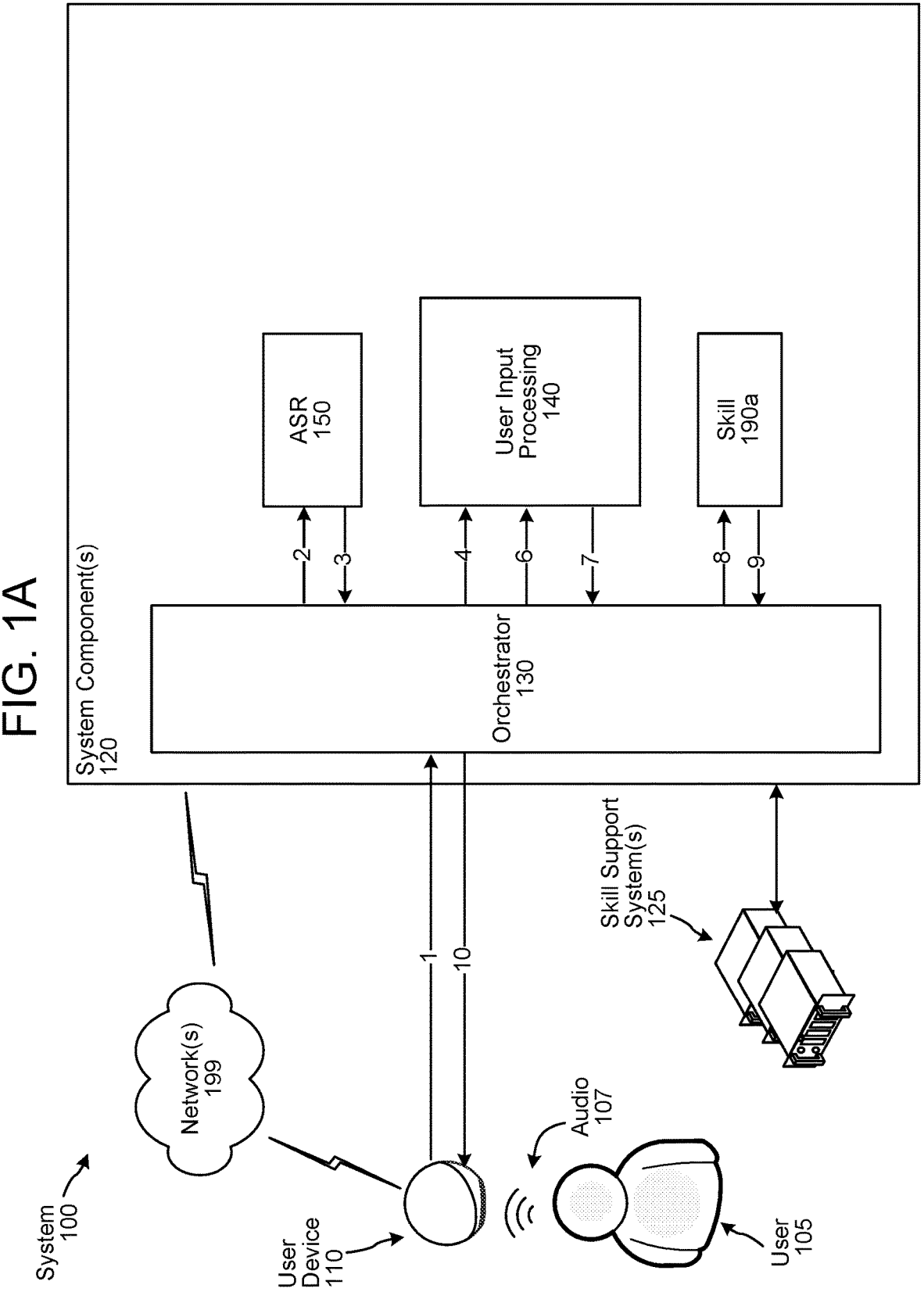
FIG. 1A illustrates a system for processing a spoken user input as different context information is available at different times, according to embodiments of the present disclosure.

Automatic speech recognition (ASR) is a field of computer science, artificial intelligence, and linguistics concerned with transforming audio data associated with speech into words (as represented by, e.g., machine/human-readable text, machine-understandable tokens, etc.) representative of that speech. Natural language understanding (NLU) is a field of computer science, artificial intelligence, and linguistics concerned with enabling machines to derive meaning from input containing natural language. Natural language generation (NLG) is a field of artificial intelligence concerned with automatically transforming data into natural language (e.g., English) content. Text-to-speech (TTS) is a field concerning transforming data into audio data that is synthesized to resemble human speech. ASR, NLU, NLG, and TTS may be used together as part of a speech-processing system.

Certain systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In yet another example, for the user input of "Alexa, set room temperature to 70 F," a system may cause a thermostat to set to the requested temperature.

The present disclosure relates to techniques for processing with respect to user inputs using a language model and processing as contextual information becomes available. A system can perform multiple iterations to determine task predictions for a user input, where an iteration is performed when different context data is available/received. For example, when a user input is received, a first group of context data may also be available, such as a device type for the device that received the user input, a time the user input is received, a location of the device/user, dialog history, and other information. The system can process the first group of context data to generate a first task prediction for the user input. At some time after the user input is received, additional context data may be available. For example, in case of the user input being a spoken input, the system determines ASR data, which may be used as additional/a second group of context data for processing the user input. After such additional context data is available, the system can process, in a second iteration, the first group of context data and the ASR data along with the first task prediction to generate a second task prediction for the user input. The system may use the first task prediction to respond to the user input (or to perform an action triggered by receipt of other data) if the system is confident in its first task prediction. If the system is not confident after processing just the first group of context data, then the system may perform the second iteration using the second group of context data to determine the second task prediction, which may be determined with a certain level of confidence. The second task prediction may then be used to generate output data. In this manner, the system processes with respect to a user input as context information is available, and uses the corresponding task prediction to generate an output. If the system is able to respond by just processing a first group of context data, then that can reduce latency. If the system is not confident in responding by just processing the first group of context data, then the system can process the second group of context data (which includes additional information helpful in predicting a task) to determine an output.

The generated task prediction can indicate an action to be performed in response to the user input, where such action may be performed by a skill component. The generated task prediction can also indicate a natural language output to be presented to the user, where such outputs may request additional information regarding the user input, present confirmation of the action being performed, etc.

In some embodiments, the system uses a language model (e.g., a large language model (LLM)) to generate the task predictions. In some embodiments, the language model may receive a prompt representing an instruction to generate a task prediction given certain relevant data, such as the available context data and the prior task prediction.

In some embodiments, the system may use knowledge data representing personalized knowledge for the user (e.g., user preferences, historic interactions, etc.), general knowledge for the system (e.g., system capabilities, supported intents, etc.), and factual knowledge (e.g., information regarding people, places, things, etc.). The system may determine relevant knowledge data based on the context data, and may use the relevant knowledge data to generate task predictions.

In some embodiments, the context data may be grouped based on, for example, an approximate time the data is available to the system for processing. When all the context data in the group is received, then the system may initiate processing using the context data of the group.

Techniques of the present disclosure may provide some advantages over other systems. For example, the techniques of the present disclosure may enable a system to reduce latency in generating responses by processing available context information to generate an output, and when needed process additional context information to generate a more accurate output.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates a system 100 for processing a spoken user input as different context data is available at different times, according to embodiments of the present disclosure. As shown in FIG. 1A, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 120 may include one or more speech processing components configured to process spoken natural language inputs using ASR and NLU processing. The system component(s) 120 may also be configured to process non-spoken inputs, such as gestures, textual inputs, selection of GUI elements, selection of device buttons, etc. The system component(s) 120 may include other components to facilitate user input processing, some of which are described below in relation to FIG. 4.

As shown in FIG. 1A, the system component(s) 120 may include an orchestrator component 130, an ASR component 150, a user input processing component 140, and a skill component 190a. The system component(s) 120 may be in direct, wired or wireless communication, over the network(s) 199, with one another. The orchestrator component 130 may be configured to route data to some of the appropriate components of the system component(s) 120 to facilitate processing of and response to a user input. However, the present disclosure is not intended to be limited to such a configuration. In some embodiments, the user device 110 may include or otherwise be configured to perform the herein disclosed processing of one or more of the orchestrator component 130, the user input processing component 140, the ASR component 150, and the skill component 190a.

The user 105 may speak an input, and the user device 110 may capture audio 107 representing the spoken input. The user device 110 may send (step 1) audio data (e.g., audio data 411 illustrated in FIGS. 4, respectively) to the system component(s) 120 for processing. In some embodiments, the user device 110 may send the audio data 411 after the user 105 has finished speaking. In other embodiments, the user device 110 may send the audio data 411 in a streaming fashion until an endpoint of speech in the audio 107 is determined.

The orchestrator component 130 may send (step 2) the audio data 411 to the ASR component 150 for processing. The audio data 411 may be associated with a session identifier corresponding to a dialog session including the instant spoken user input. The orchestrator component 130 may associate the session identifier with other data related to the dialog session. The ASR component 150 may process the audio data 411 to determine ASR data (e.g., token data, text data, N-best list of ASR hypotheses including token or text data and corresponding confidence scores, etc.) representing the words spoken by the user 105. Further details on the processing of the ASR component 150 are described below in relation to FIG. 4.

The ASR component 150 may send (step 3) the ASR data (which may be associated with the session identifier) to the orchestrator component 130.

The orchestrator component 130 may send (step 4) the ASR data to the user input processing component 140. The user input processing component 140 may be configured to process the user input, context information and other knowledge to determine an action to be performed. The user input processing component 140 may generate predictions for tasks to be completed in response to the user input and can cause interactions with the user 105 when additional information is needed to complete a task.

Figure 1B:
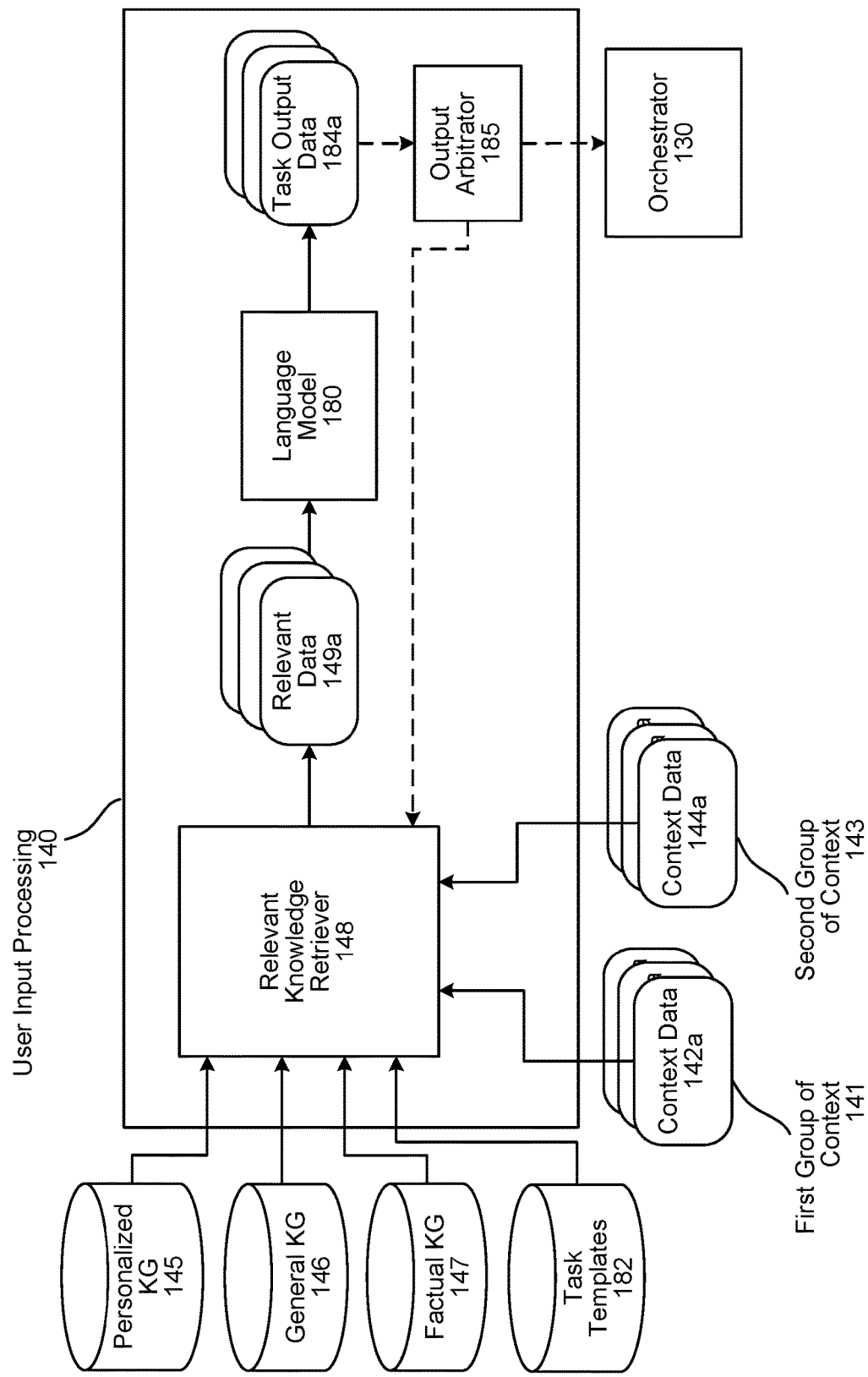
FIG. 1B illustrates example components of a user input processing component, according to embodiments of the present disclosure.

In some embodiments, the user input processing component 140 may be configured to process with respect to a user input in multiple iterations (e.g., multi-hop processing). In some embodiments, some of the context information may be available before other of the context information, and the user input processing component 140 may process using the available context information, then may process again using the other available context information. FIG. 1B illustrates further details of the user input processing component 140.

Referring to FIG. 1B, the user input processing component 140 may include a relevant knowledge retriever 148, that may process knowledge data from various sources, for example, a personalized knowledge graph (KG) 145, a general knowledge graph (KG) 146, and a factual knowledge graph (KG) 147, and may process context data 142, 144 that may be available in groups 141, 143, at different times. Other sources may also be used, for example information sources that may organize information in a manner other than as a knowledge graph.

The relevant knowledge retriever 148 may extract relevant data from each of the KGs 145, 146, 147 given the contextual information represented in the context data 142, 144. For example, the time the user input is received and a device type of the user device 110 can be used to identify relevant user affinity/preference information from the personalized KG 145. In some embodiments, the knowledge data within the individual knowledge sources 145, 146, 147 may be precomputed and stored as tensors or other type of data (within the KGs 145, 146, 147 or another component). In some embodiments, the relevant knowledge retriever 148 may determine a tensor representation of the context data 142, 144, and may use the tensor(s) to retrieve a subset of relevant tensors from the stored KG tensors. Each retrieved relevant tensor may represent a relevant fact about the given context/environment of the user 105. The relevant tensors may be included in relevant data 149, which may be provided to a language model 180 for processing. In some embodiments, the relevant knowledge retriever 148 may convert the relevant tensor(s) into a natural language description of the represented fact(s), and may include in the relevant data 149 text data representing the natural language description. The relevant knowledge retriever 148 may be configured to provide updated knowledge data given updated context data without having to retrain the language model 180. Rather the system can update the KGs 145, 146, 147 to include up to date information and use that information to influence the output of the language model 180.

The KGs 145, 146, 147 may represent prior knowledge in a graph data structure. The personalized KG 145 may correspond to the user 105 (or a group of users that are similar to the user 105, a group of users in the user 105 household, etc.) and may represent historical interactions, user preferences, enabled skills/functionalities, etc. and relationships among them. The general KG 146 may correspond to the system 100 and may represent system capabilities, such as intent, entities, etc. and relationships among them. The factual KG 147 may represent facts/concepts about people, places, things, etc. and relationships among them. In some embodiments, the relevant knowledge retriever 148 may use unstructured or structured knowledge, for example, from the web.

In some embodiments, the relevant knowledge retriever component 148 may also be in communication with a task templates storage 182. The task templates storage 182 may store templates for segmenting complex tasks into primitive/smaller tasks. The relevant knowledge retriever component 148 may identify one or more templates from the storage 182 that may be relevant for segmenting a task, which may be indicated in a user input/the ASR data, may be determined to be performed in response to receiving certain context data 142, 144, may be determined by the language model 180 during a first iteration and represented in the task output data 184, etc.

The context data 142, 144 may represent multi-modal signals observed by different sensors when or around the time the user 105 provides the user input, where such signals may represent the user's environment, including local time, user's current and previous interactions (in a short time) with the system 100, the device type of the user device 110, user's location, user's activity, and the like. The context data 142, 144 may also represent confidences and signals from one or more of the system components 120, for example, ASR hypotheses and corresponding ASR confidence scores, wakeword detection signal and corresponding confidence score, system-directed input signal and corresponding confidence score, NLU hypotheses and corresponding confidence scores, etc.

Given the relevant data 149, the language model 180 may identify a task that facilitates the user's goal and may generate a prediction indicative of such task. Examples tasks that the language model 180 may predict are text/input classification, natural language generation, question/answering, text summarization, and requesting additional information from a user. Other tasks may be predicted depending on system configuration. The language model 180 may be a generative model and may generate task output data 184 including the predicted task.

The language model 180 may determine, as one of the predicted tasks, an appropriate output to be presented to the user 105. For example, given a user input "Alexa, show me the weather of Vancouver", the predicted task may be to request confirmation from the user 105 by outputting "Do you mean the weather of Vancouver, Washington?" Another example output predicted by the language model 180 may be outputting a suggestion of "Would you also like to know the UV index of Vancouver?"

The user input processing component 140 may be able to respond to some user inputs with a single-hop inference, i.e., one pass at processing with respect to the user input. For other user inputs, the user input processing component 140 may perform multi-hop inferences, i.e., iterative processing with respect to the user input, to determine more than one task to be performed in response to the user input.

For single-hop cases, the user input processing component 140 may use one or more mechanisms to achieve task selection. One of the mechanisms may be heuristic-based when the number of tasks to predict from is small. For example, the user input processing component 140 may select a task with the highest confidence score to present an output to the user 105. As another example, the user input processing component 140 may use a rules engine to select a task. Another mechanism may be machine learning (MIL)-based, which may use reinforcement learning based on dialog session-based and turn-based feedback metrics that allows the language model 180 to jointly learn task arbitration and task prediction. For example, during the training process, the language model 180 may learn to generate an output that combines both decisions: given user's request "show me the weather of Vancouver", the language model 180 may directly generate a response of "do you mean the weather of Vancouver, Washington?" Yet another mechanism may be a dedicated policy-network, which may use a separate policy network that takes the prediction outputs for different tasks from the language model 180 and selects the final output to present to the user 105. The policy network may be either a generation model or a ranking model, and may be optimized using dialog session-based and turn-based metrics jointly.

In single-hop inferencing, the user input processing component 140 may wait to receive all the context data 142, 144 before initiating processing with respect to the user input. In some cases, the context data 142 may be available before the context data 144. For example, the context data 142a representing device information for the user device 110 (e.g., device type, device location, device capabilities, etc.) may be available before the context data 144a representing ASR data. During single-hop inferencing, the user input processing component 140 may wait for the foregoing example context data to become available.

In some embodiments, to reduce latency, certain context data may be grouped, for example, based on an estimated time the context data will be available. The context data may be categorized into Ngroups, for example, as shown in FIG. 1B, at least a first group 141 and a second group 143. Depending on system configuration, more groups of context data may be formed. For example, the first group 141 may include context data 142a representing dialog history, context data 142b representing local time, and context data 142c representing device type of the user device 110, and the second group 143 may include context data 144a representing ASR hypotheses and corresponding confidence scores, and context data 114*b* representing device status of the user device(s) 110 of the user 105.

In some embodiments, the user input processing component 140 may process with respect to the user input when the context data in a group is available and may result in iterative processing (e.g., for N=number of groups iterations). For example, in a first iteration, the user input processing component 140 may process the first group of context 141 and generate first task output data 184*a*; in a second iteration, the user input processing component 140 may process the second group of context 143, along with the first group of context 141 and the first task output data 184*a* to generate second task output data 184*b*. The language model 180 may continue processing of the first task output data 184*a* by adding contextual information from the second group of context 143 as prompts.

In some embodiments, the user input processing component 140 may include an output arbitrator 185 that may determine whether a task prediction is to be used to provide an output or whether further iteration of processing is needed. The output arbitrator 185 may determine that the first task output data 184*a* is associated with a (first) confidence score representing the language model 180 confidence in predicting the task, and may determine whether the first confidence score satisfies a condition (e.g., exceeds a threshold score). If the first confidence score satisfies the condition, then the output arbitrator 185 may send the first task output data 184*a* to the orchestrator 130 for further processing (e.g., to perform the predicted task). If the first confidence score does not satisfy the condition, then the output arbitrator 185 may cause an additional iteration of processing by sending the first task output data 184*a* to the relevant knowledge retriever component 148 (or another component). The additional iteration of processing may generate the second task output data 184*b*, which may be evaluated by the output arbitrator component 185 (based on an associated second confidence score) to determine whether it can be used to generate an output or whether an additional iteration of processing is to be performed.

In some embodiments, the output arbitrator 185 may re-rank the task predictions in the first task output data 184*a* from the first iteration of processing in view of the second group of context 143, where the re-ranked task predictions may be provided as the second task output data 184*b*. For example, the first task output data 184*a* may be the following ranked list of predicted tasks: 1) present weather for [first city]; 2) present weather for [second city]; 3) ask user for clarification on location. Based on the second group of context data 143 indicating that the user is in the [second city], the second task output data 184*b* may include the only following task: 1) present weather for [second city] or the second task output data 184*b* may include a re-ranked list of tasks: 1) present weather for [second city]; 2) present weather for [first city]; 3) ask user for clarification on location.

In some embodiments, the user input processing component 140 may determine (e.g., divide, segment, decompose, etc.) for a given complex task (e.g., "reserve a taxi for my upcoming flight", etc.), a set of primitive tasks that can be performed by the system component(s) 120. For each primitive task, the language model 180 may identify precondition gaps that may require engagement with the user 105 to fill (e.g., request information from the user 105). The user input processing component 140 may generate output for each primitive task, and the output may be further processed using the system component(s) 120, for example, the skill component 190. The user input processing component 140 may identify postcondition gaps that may require engagement with the user 105 to fill (e.g., request information from the user 105). In some cases, the user input processing component 140 may adjust the decomposed primitive tasks as needed, and may determine (e.g., compose) the final output.

In some embodiments, the user input processing component 140 may use one or more templates, identified from a task template storage 182, to decompose a complex task and iteratively generate an intermediate output for primitive tasks. If the user 105 provides additional information (upon request), the user input processing component 140 may access the additional information as the context data 142, 144 including dialog history data or may access the additional information an input. When the final step of composition is needed (e.g. assemble all required results for screen display or text summarization), the language model 180 may be prompted to generate the final output conditional on the entire dialog session history.

In other embodiments, the language model 180 may learn to jointly conduct the task decomposition and generate the intermediate output in an end-to-end way. When user engagement is needed, the model may pause the generation and incorporate users' responses (e.g., as prompts) before the generation resumes.

Referring to FIG. 1A, the user input processing component 140 may receive (step 4) the ASR data generated by the ASR component 150, where the ASR data may be the context data 144*a* of the second group of context 143. At some time prior to receiving the ASR data (e.g., after the user input is received by the orchestrator component 130, when the audio data 411 is sent to the ASR component 150, etc.), the user input processing component 140 may receive the context data 142 of the first group of context 141, where the context data 142 may include device type of the user device 110, current time when user input is received, device location, and other context information that may be available.

Upon receiving the context data 142, the user input processing component 140 may determine first relevant data 149*a* (shown in FIG. 1B) as a subset of the knowledge included in the KGS 145, 146, 147, and the language model 180 may process the first relevant data 149*a* to generate first task output data 184*a*. Upon receiving the context data 144 (including the ASR data), the user input processing component 140 may determine second relevant data 149*b*, in view of the context data 142, 144 and the first task output data 184*a*, and the language model 180 may process the second relevant data 149*b* to generate second task output data 184*b*.

In other embodiments, the language model 180 may receive as input the context data 142, 144 and the first task output data 184*a* to generate the second task output data 184*b*. The language model 180 may also receive the second relevant data 149*b* that may represent relevant knowledge data in view of the context data 142, 144.

The task output data 184 may include a task prediction associated with a confidence score or a N-best list of task predictions with corresponding confidence scores. In some embodiments, the task output data 184 may be a tuple of the form {Interpretation, Skill} which may signify the final recommendation of the model alongside a confidence score for the prediction.

For an example spoken user input "Show me the weather of Vancouver", corresponding audio data may be provided to the ASR component 150 for processing. The determined ASR data may be provided as the first group of context data 141 to the user input processing component 140. Based on processing the ASR data (and other relevant information), the language model 180 may determine the first task output data 184a with a first confidence score. In this example, the language model 180 may be unsure about which "Vancouver" the user input is referring to. As such, the first task output data 184a may include a task of presenting weather for some first city "Vancouver" with a low confidence score ({WeatherIntent, "Vancouver" [confidence score]}), and may also include a task of requesting additional information/ clarification from the user 105. The output arbitrator 185 may determine to send the task of requesting additional information/clarification to the orchestrator 130 for processing. In some embodiments, the output arbitrator 185 may send the task of presenting weather for the first city "Vancouver" to the relevant knowledge retriever component 148 for an additional iteration of processing.

At this point, two example situations may occur. In the first example case, the orchestrator component 130 may cause output of a request for additional information (e.g., display text, output synthesized speech, etc.) from the user 105 via the user device 110. The user 105 may provide additional information, for example, the state and/or country for the desired city Vancouver. The user input processing component 140 may receive the additional user input (e.g., the corresponding ASR data) as the second group of context data 143, and may perform a second iteration of processing to generate the second task output data 184b. The second task output data 184b may include a task for presenting weather for the city Vancouver of the state/country indicated by the user, and the task may be associated with a high confidence score. The output arbitrator 185 may send the second task output data 184b to the orchestrator 130 for further processing, which may result in the system presenting weather for the city Vancouver based on additional information from the user 105.

In the second example case, the user input processing component 140 may receive the second group of context data 143 that may include a location of the user device 110, a location indicated in a user profile, a location the user previously requested weather for, etc. The user input processing component 140 may perform a second iteration of processing, using the first task output data 184a and the first and second groups of context data 141, 143, and may determine second task output data 184b. Here the second task output data 184b may include a task to present weather for a specific city Vancouver that may be identified based on the second group of context data 143, and the task may be associated with a high confidence score. The output arbitrator 185 may send the second task output data 184b to the orchestrator 130 for further processing, which may result in the system presenting weather for the city Vancouver based on the context data available to the system. The system may continue processing using the available context data while waiting for additional information from the user 105 or in case the user 105 does not provide additional information.

As another example, the system may receive a user input "How is the weather today?", and the user input processing component 140 may receive as the first group of context data 141 device context for the user device 110 (e.g., device location, time the user input is received, device type, etc.). While the ASR component 150 is processing audio data for the user input, the user input processing component 140 may process the first group of context data 141 and determine first task output data 184a. Based on at least the historical user interactions (e.g., from the personalized KG 145) and the first group of context data 141, the first task output data 184a may be a task for presenting weather for the device location and may be associated with a high confidence. The output arbitrator 185 may send the first task output data 184a to the orchestrator component 130 for further processing, for example, to at least obtain weather information for a city where the device 110 is located. In some cases, the weather information may be presented to the user 105 via the user device 110. In some examples, the system (e.g., the arbitrator 170) may determine to present the weather information after the ASR component 150 has generated the ASR data, and the user request is in fact for "today's" weather. In this manner, when the user input processing component 140 is confident, then to reduce latency, the first task output data 184a based on a first iteration of processing, may be used to generate an output.

The user input processing component 140 may send (step 7) the task output data 184 to the orchestrator component 130, where the task output data 184 may include a skill identifier associated with the skill component 190a. The task output data 184 may also include information that the skill component 190a may use to perform an action responsive to the user input. For example, the task output data 184 may include an intent and entity information.

The orchestrator component 130 may send (step 8) the information included in the task output data 184 to the skill component 190a based on receiving the skill identifier from the user input processing component 140. In some embodiments, the skill component 190a may communicate with a skill support system(s) 125 to generate output data.

The skill component 190a may determine output data responsive to the user input. The output data may correspond to a natural language output which may be presented by the device 110 as synthesized speech or displayed text. The output data may include text, other type natural language representation data, images, graphics, etc. The skill component 190a may send (step 9) the output data to the orchestrator component 130. In the case where the output data is to be presented as synthesized speech, the orchestrator component 130 may send the output data to a TTS component 480 (shown in FIG. 4).

The orchestrator component 130 may send (step 10) the output data to the user device 110 to cause presentation of the output data. The user device 110 may present audio representing synthesized speech, may display text, graphics, images, etc., may output a notification (e.g., an app notification, a push notification, etc.), may cause a light (e.g., a yellow light ring) or other visual output device to activate, etc. The output data may be presented via the user device 110 or via another user device that is associated with the user 105.

As described, the process of FIG. 1A may be initiated in response to receiving a user input from the user 105 via the user device 110. In other examples, the process of FIG. 1A may be initiated in response to receiving data other than a user input. Such data may be an event detected by the user device 110 or another user device. Examples of an event include a change in a device state (e.g., the front door opened, the thermostat reached a particular temperature, a timer ended, etc.), detection of an acoustic event (e.g., a baby crying, an appliance sound, glass breaking, etc.), a particular environment condition occurring (e.g., a certain time/date/day, a change in device location, addition of new device to the user profile/account, etc.), a user-indicated event (e.g., a user requested reminder for an event occurring, a calendar event, etc.) and the like. The system component(s) 120, in particular the user input processing component 140, may receive context data 142 indicative of the event occurring, in response to which the user input processing component 140 may initiate processing, for example, of the context data 142 as described herein. Processing based on receiving non-user-input data may result in the system generating an output as described in relation to steps 8, 9 and 10 of FIG. 1A.

Referring to FIG. 1B, in some embodiments, the language model 180 may be a large language model (LLM). Language modeling (LM) is the use of various statistical and probabilistic techniques to determine the probability of a given sequence of words occurring in a sentence. Language models analyze bodies of text data to provide a basis for their word predictions. A LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models.

In some embodiments where the language model 180 is an LLM, the language model 180 may be a transformer-based seq2seq model involving an encoder-decoder architecture. In an encoder-decoder architecture, the encoder may produce a representation of an input text using a bidirectional encoding, and the decoder may use that representation to perform some task. In some such embodiments, the language model 180 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model 180 may be pre-trained for approximately 1 trillion tokens. Being trained on CLM tasks, the language model 180 may be capable of in-context learning. An example of such a LLM is Alexa Teacher Model (Alexa™).

In other embodiments, where the language model 180 is an LLM, the language model 180 may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include a machine learning model(s) other than a language model 180. Such machine learning model(s) may receive text and/or other types of data as inputs, and may output text and/or other types of data. Such model(s) may be neural network based models, deep learning models, classifier models, autoregressive models, seq2seq models, etc.

In embodiments where the language model 180 is an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.).

In some embodiments, the user input processing component 140 may determine whether the language model 180 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the user input processing component 140 may use a knowledge base, web search, etc. to fact-check information included in the output.

In some embodiments, the language model 180 may be fine-tuned to generate task predictions as described herein. Fine-tuning of the language model 180 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, the language model 180 may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than some of the fine-tuning techniques described above. For example, the language model 180 may receive, included in the relevant data 149, one or more exemplars/demonstrations representing an example output for the requested task. Using the exemplars/demonstrations, the language model 180 may perform in-context learning to generate the task output data 184.

In some embodiments, user feedback may be used to update/retrain the user input processing component 140. The user feedback may be provided during the dialog session as a subsequent user turn, for example, in response to a system response (referred to as turn-based feedback). For example, in a first turn the user 105 may request performance of an action, an appropriate system response may be presented, in a second turn the user 105 may provide feedback with respect to the system response (e.g., the user may say "thank you", "that's not right", may repeat the request, etc.). In other cases, user feedback may be provided after the dialog session has ended (referred to as dialog-session based feedback). For example, the device 110 may continue output of content, the user 105 may provide feedback at a later time, etc.

User feedback may not only indicate whether the system's response met the users' expectations but may also suggest what went wrong and how the system should have performed in the case of negative feedback. Within a dialog session, a user may provide feedback on the system's responses, either explicitly or implicitly. An example case of implicit feedback is rephrasing. For example, after realizing the song being played is not the one requested, a user may rephrase the initial request with more specifics: "Play [song name] by [artist name]." More implicit feedback can be derived from user behaviors. For example, when the system finds a song that is not what the user wanted, the user may stop playback of it or may barge in, i.e., interrupt the system while it is responding. The foregoing example of implicit feedback may be identified as negative feedback. On the other hand, if the song being played is the one requested, then the user may listen to the song without any immediate action or may tune the volume to the desired level to enjoy it. In this example, the implicit feedback may be identified as positive feedback.

User feedback can also be explicit, i.e., directly indicating the system's success or failure. For example, in unsolicited cases, the user may provide positive explicit feedback such as "Alexa, you are smart" or "That is helpful, thank you". The user may also express their frustrations, e.g., "No, not that song", which may be determined as negative feedback. In some embodiments, the system can solicit explicit feedback by asking a confirmation question like "Did I play what you wanted?" after the action is taken, or "Did you mean [song name]?" before taking the action.

To jointly train and continuously improve the user input processing component 140 for all tasks, a feedback learning mechanism that optimizes the component (e.g., language model 180) parameters by leveraging end-to-end user feedback metrics (e.g., user perceived defect/output of undesired response). The user feedback metrics may include both turn-based and session-based measurement of the quality of a user experience. The turn-based metrics may guide the component to address immediate requirement from users such as during the same dialog session (e.g., modifying the system response to presented a desired response), and the session-based metrics may guide the component to address latent requirement from users that may not be achieved by just modifying a single data input and may need updating of rules, models, etc.

In some embodiments, the system may include a feedback simulator that may generate simulated feedback metrics. The generated feedback metrics from the simulator can be used during the training process for the user input processing component 140. The simulator may predict how the user 105 will react to the predicted results from the user input processing component 140. The feedback simulator may also receive actual user feedback from interactions between the users and the system, and may use the actual user feedback to retrain/update its processing. Using the feedback metrics (actual and simulated), the language model 180 can be enhanced through different approaches. For example, a Cross-Entropy (CE) trained language model may be continuously trained using a reinforcement learning algorithm. In other examples, the system may include a separate language model that re-ranks the N-best output from the CE trained language model or generates a corrected/updated prediction using an initial hypothesis from the CE-trained language model.

In some embodiments, during the learning/training process the language model 180 may receive inputs (e.g., prompts) to perform tasks, in parallel, with exemplars for the task, where the exemplar may include a user input (indicated with a [USER] token) and a corresponding system response (indicated with a [SYSTEM] token). The exemplar may be more than one turn of a dialog session. For example, the language model 180 may receive the following three inputs:

First input: {Predict NLU hypothesis: [USER] turn lamp red [SYSTEM] ok [USER] turn brightness down to one percent}

Second input: {Generate rewrite: [USER] turn lamp red [SYSTEM] ok [USER] turn brightness down to one percent}

Third input: {Predict event occurrence: [USER] turn lamp red [SYSTEM] ok [USER] turn brightness down to one percent}

In response to receiving the three example inputs, the language model 180 may generate the following three example outputs:

First output: {NLU hypothesis: HomeAutomationSetValueIntent | ActionEvent: turn DeviceName: lamp | Direction: down | Setting: brightness | SettingValue: one | ValueType: percent}

Second output: {Rewrite: turn down lamp brightness to one percent}

Third output: {Event: user input}

In other embodiments, the language model 180 may be configured to output a sequence of tasks to be performed instead of separate outputs per task. The language model 180 may receive the example input below:

Input: {[USER] turn lamp red [SYSTEM] ok [USER] turn brightness down to one percent}

The language model 180 may output the following example with multiple tasks indicated with a corresponding token in [ ]:

Output: {[Rewrite] turn down lamp brightness to one percent [Event] user input [NLU hypothesis] HomeAutomationSetValueIntent | ActionEvent: turn | DeviceName: lamp Direction: down | Setting: brightness | SettingValue: one | ValueType: percent}.

In some embodiments, the language model 180 may be configured to perform a rewrite task which may involve generating an alternative representation for a user input, where the alternative representation (rewrite) can result in a desired response. As part of the rewrite task, the language model 180 may determine that a user input (e.g., as represented in the ASR data) is likely to result in an undesired response (e.g., an error in processing the user input; misunderstanding what the user said; presenting as output something the user did not request; etc.), and based on that determination may generate an alternative representation for the user input, where the alternative representation may result in a desired response to the user input. The generated alternative representation may correspond to a different intent, a different entity, a different domain, or may include different words than the user input represented in the ASR data. The alternative representation may be generated based on the context data 141, 143 related to the user input, the user device 110 and/or the user 105 (e.g., device type, device location, user input type, time the user input is provided, past user interactions, user preferences stored in profile storage 670, etc.). For example, for a user input "How is the weather in Boston?" an alternative input representation may be "How is the weather in Austin?" (e.g., based on the device location being Austin). As another example, for a user input "Play music by Lady baba" an alternative input representation may be "Play music by Lady Gaga."

Figure 2:
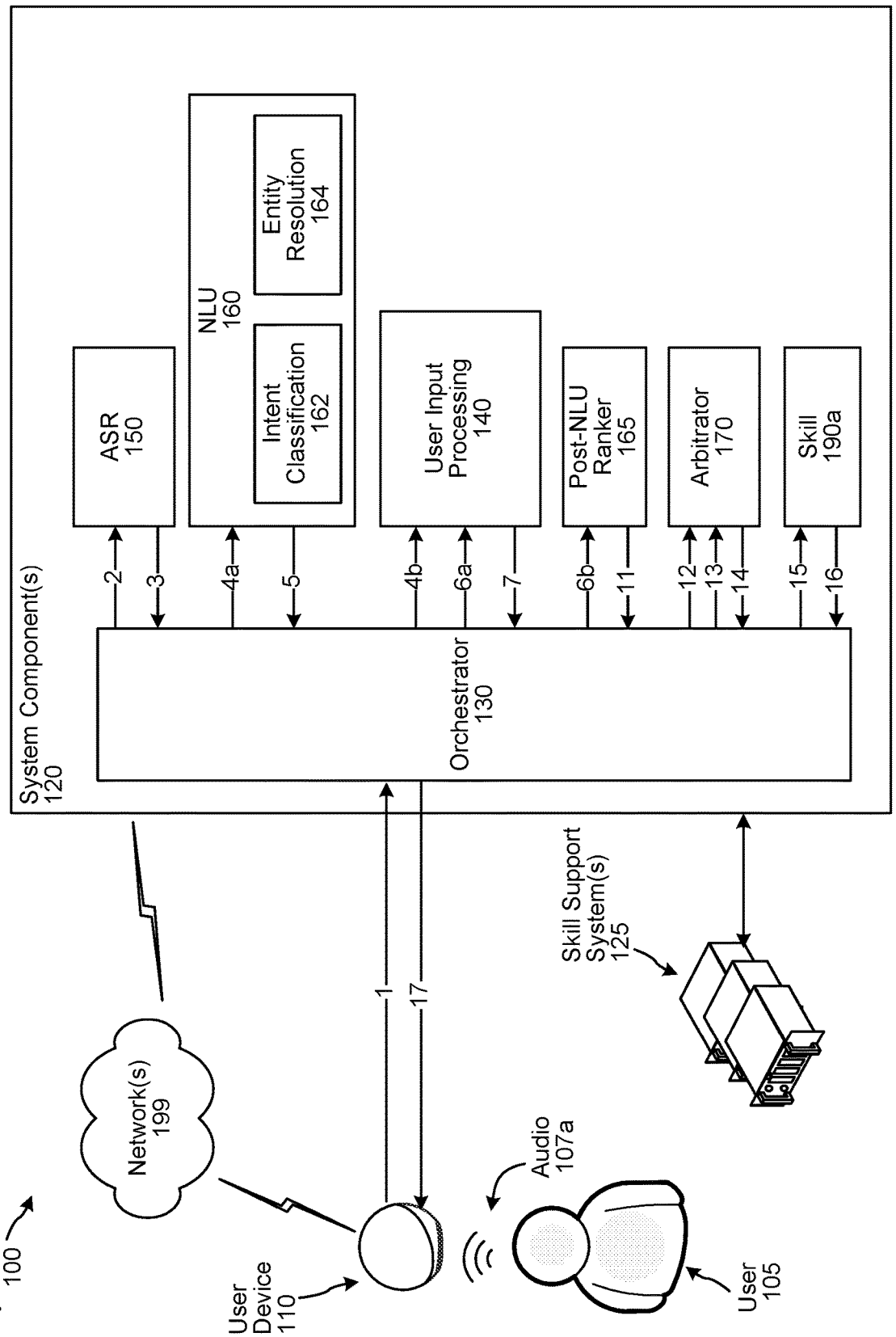
FIG. 2 illustrates another example system for processing a spoken user input as different context information is available at different times, according to embodiments of the present disclosure.

FIG. 2 illustrates another example system for processing user inputs as context data is available at different times. The system 100 of FIG. 2 may include similar components as the system 100 shown in FIG. 1A. Additionally, the system component(s) 120 may include a NLU component 160. The system 100 may also perform steps 1 to 3 in a similar manner as described with relation to FIG. 1A. At a step 4a, the orchestrator component 130 may send the ASR data to the to the user input processing component 140, and as described above in relation to FIG. 1A, the user input processing component 140 may perform processing using the ASR data to determine the task output data 184.

At a step 4b, the orchestrator component 130 may also send the ASR data to the NLU component 160 for processing. The NLU component 160 may attempt to make a semantic interpretation of the word(s) or statement(s) represented in the spoken input by determining one or more meanings associated with the word(s) or statement(s) indicated in the ASR data. The NLU component 160 may include an intent classification component 162 and an entity resolution component 164. The NLU component 160, using the intent classification component 162, may determine an intent representing an action that a user desires be performed and may determine information that allows a system component and/or device to execute the intent. The NLU component 160 may determine an entity type and an entity value corresponding to the user input. For example, the NLU component 160 may determine that the user input includes a song name: "[song]". Using the entity resolution component 164, the NLU component 160 may determine an actual entity the user input corresponds to. For example, the entity resolution component 164 may determine the [song] and may provide an identifier that can be used to access (e.g., play) the [song]. The NLU component 160 may determine NLU data including one or more NLU hypotheses, where individual NLU hypotheses may include a corresponding domain indicator, intent indicator, entity data (e.g., entity types, entity values), skill indicator, and/or NLU confidence score. Further details on the processing of the NLU component 160 are described below in relation to FIG. 4. The NLU component 160 may send (step 5) the NLU data to the orchestrator component 130.

The orchestrator component 130 may send (step 6) the NLU data generated by the NLU component 160 to the user input processing component 140. The NLU data may be context data of a third group (not shown in FIG. 1i). Upon receiving the NLU data, the user input processing component 140 may determine, as described in relation to FIG. 1B, third relevant data 149c, in view of the NLU data and the second task output data 184b, and the language model 180 may process the third relevant data 149c to generate third task output data 184c.

The user input processing component 140 may send (step 7) the task output data 184 to the orchestrator component 130, where the task output data 184 may indicate a first skill component 190a that is to be used to respond to the user input.

In this example embodiment, the orchestrator component 130 may send (step 6b) the NLU data to a post NLU ranker 165 for processing in addition to the user input processing component 140. The post-NLU ranker 165 may determine a skill component appropriate for responding to the spoken user input using information included in the NLU data. Further details on the post-NLU ranker 165 are described below in relation to FIG. 4. The post-NLU ranker 165 may send (step 11) a skill identifier for a second skill component 190b that is capable of performing an action in response to the user input.

The orchestrator component 130 may send (step 12) the task output data 184 to an arbitrator component 170 after it is received from the user input processing component 140. The orchestrator component 130 may send (step 13) the skill identifier for the second skill component 190b to the arbitrator component 170 after it is received from the post-NLU ranker 165. The arbitrator component 170 may determine which skill component is to be executed—one identified by the user input processing component 140 or one identified by the post-NLU ranker 165. The arbitrator component 170 may be configured to balance between latency and accuracy in selecting a skill component. In some cases, the task output data 184 may be received by the arbitrator component 170 before the post-NLU ranker 165 output; in other cases, the post-NLU ranker 165 output may be received by the arbitrator component 170 before the task output data 184. The arbitrator component 170 may select the skill component indicated in the data received first if the corresponding confidence score satisfies a condition (e.g., exceeds a threshold value). In some cases, the skill component indicated in the task output data 184 and the post-NLU ranker 165 output may be the same, in which case, the arbitrator component 170 may select the indicated skill component. In some embodiments, the arbitrator component 170 may use a rules engine to select the skill component. In some embodiments, the arbitrator component 170 may use a machine learning model to select the skill component. The arbitrator component 170 may consider various data, such as, historical user interactions of the user 105, context data corresponding to the user input (e.g., time user input is received, location, device type, etc.), user preferences, skills enabled for the user profile of the user 105, device capabilities, etc. In some embodiments, the arbitrator component 170 may not select the skill component indicated in the task output data 184 if the skill component is from a list of predefined skills that the user input processing component 140 is not allowed to access (e.g., use to respond to a user input) without, for example, other conditions being satisfied (e.g., the post-NLU ranker 165 also indicated the same skill component; another component verifying the task output data 184; etc.).

The arbitrator component 170 may send (step 14) a skill identifier for the selected skill component 190a. The orchestrator component 130 may send (step 15) data (e.g., intent data, task data, entity data, etc.) to the skill component 190a based on receiving the skill identifier from the arbitrator component 170. In some embodiments, the skill component 190a may communicate with a skill support system(s) 125 to generate output data.

The skill component 190a may determine output data responsive to the user input. The output data may correspond to a natural language output which may be presented by the device 110 as synthesized speech or displayed text. The output data may include text, other type natural language representation data, images, graphics, etc. The skill component 190a may send (step 16) the output data to the orchestrator component 130. In the case where the output data is to be presented as synthesized speech, the orchestrator component 130 may send the output data to a TTS component 480 (shown in FIG. 4).

The orchestrator component 130 may send (step 17) the output data to the user device 110 to cause presentation of the output data. The user device 110 may present audio representing synthesized speech, may display text, graphics, images, etc., may output a notification (e.g., an app notification, a push notification, etc.), may cause a light (e.g., a yellow light ring) or other visual output device to activate, etc. The output data may be presented via the user device 110 or via another user device that is associated with the user 105.

Figure 3:
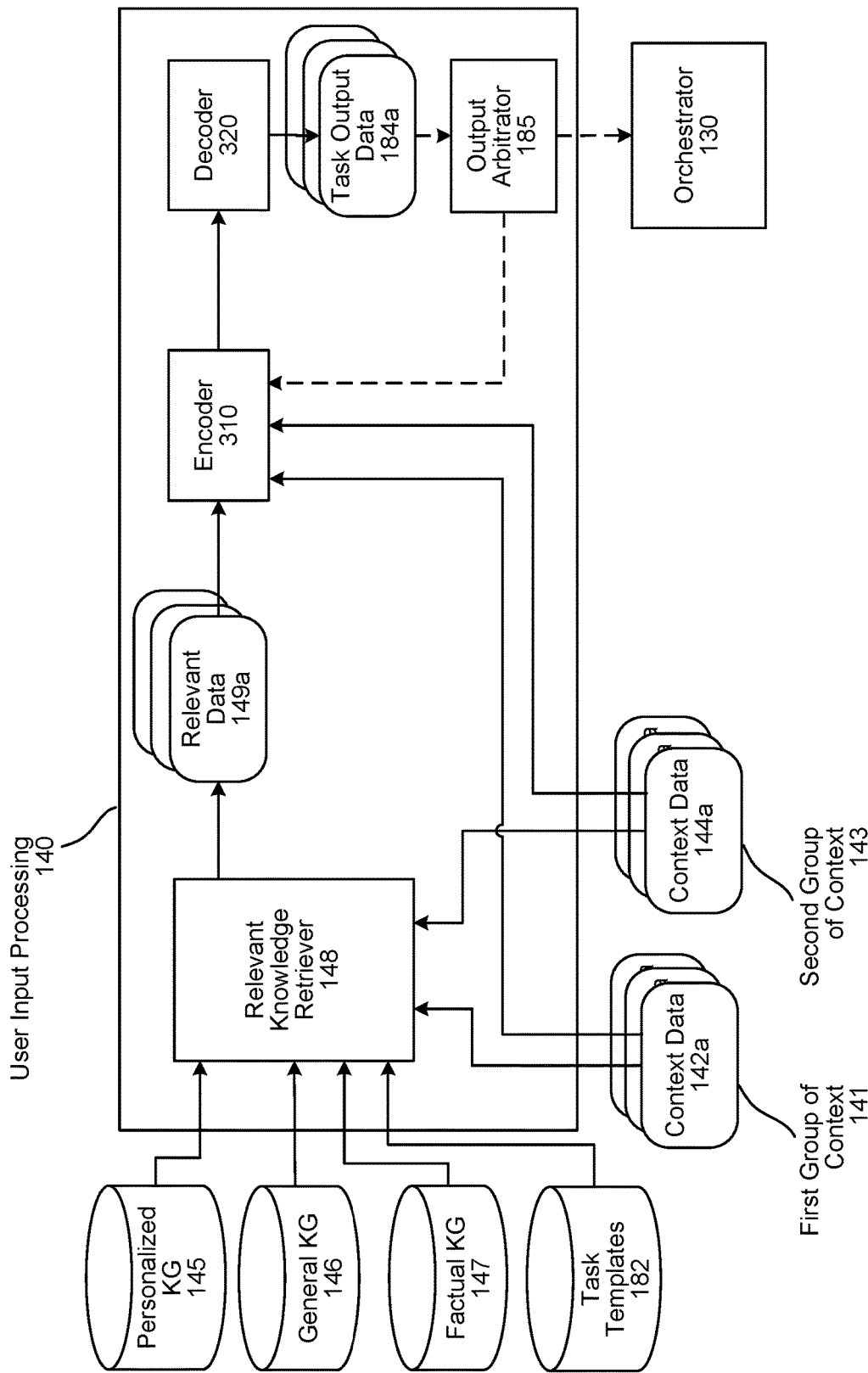
FIG. 3 illustrates another example configuration of the user input processing component, according to embodiments of the present disclosure.

FIG. 3 illustrates another example embodiment of the user input processing component 140. As shown, in this example, instead of a language model, the user input processing component 140 may include an encoder 310 and a decoder 320.

The encoder 310 may project the context data 142, 144 and the relevant knowledge data 149 into a high-dimension representation space for the decoder 320 to process. The encoder 310 may be configured to support multi-lingual and multi-modal inputs (e.g. image, audio, text, etc.). In some embodiments, the encoder 310 may also receive as input an optional encoder prompt. The encoder prompt may add a prefix (e.g., continuous as tensor or discrete as natural language) to the input to suggest the task of the model. For example, a prefix of "generate disambiguation" may be added for the task of confirming or obtaining additional information from user. As another example, a prefix of "generate rewrite" may be added for the task of generate a query rewrite for the user input.

The decoder 320 may process the representations from the encoder 310 and may generate output in an autoregressive way. The decoder 320 may be configured to support multi-lingual and multi-modality. The decoder 320 may also receive an optional decoder prompt that may be used to add a prefix (tensor or natural language) before the decoder starts to generate the task prediction. The prefix can indicate the task (e.g. using a special token of '[Rewrite]' before starting query rewrite task), incorporate one shot or few shot demonstrations (e.g. "the user is setting up a routine and is likely to try out the new routine by saying 'turn off my fan' "; "the user belongs to a bilingual household of German and English and is likely to say requests in German"), and state updated situational context which is not available when the decoder 320 begins to process (e.g. 'the user has the live room light off'). The decoder 320 may support multiple tasks in either parallel, sequential or a hybrid way.

Figure 4:
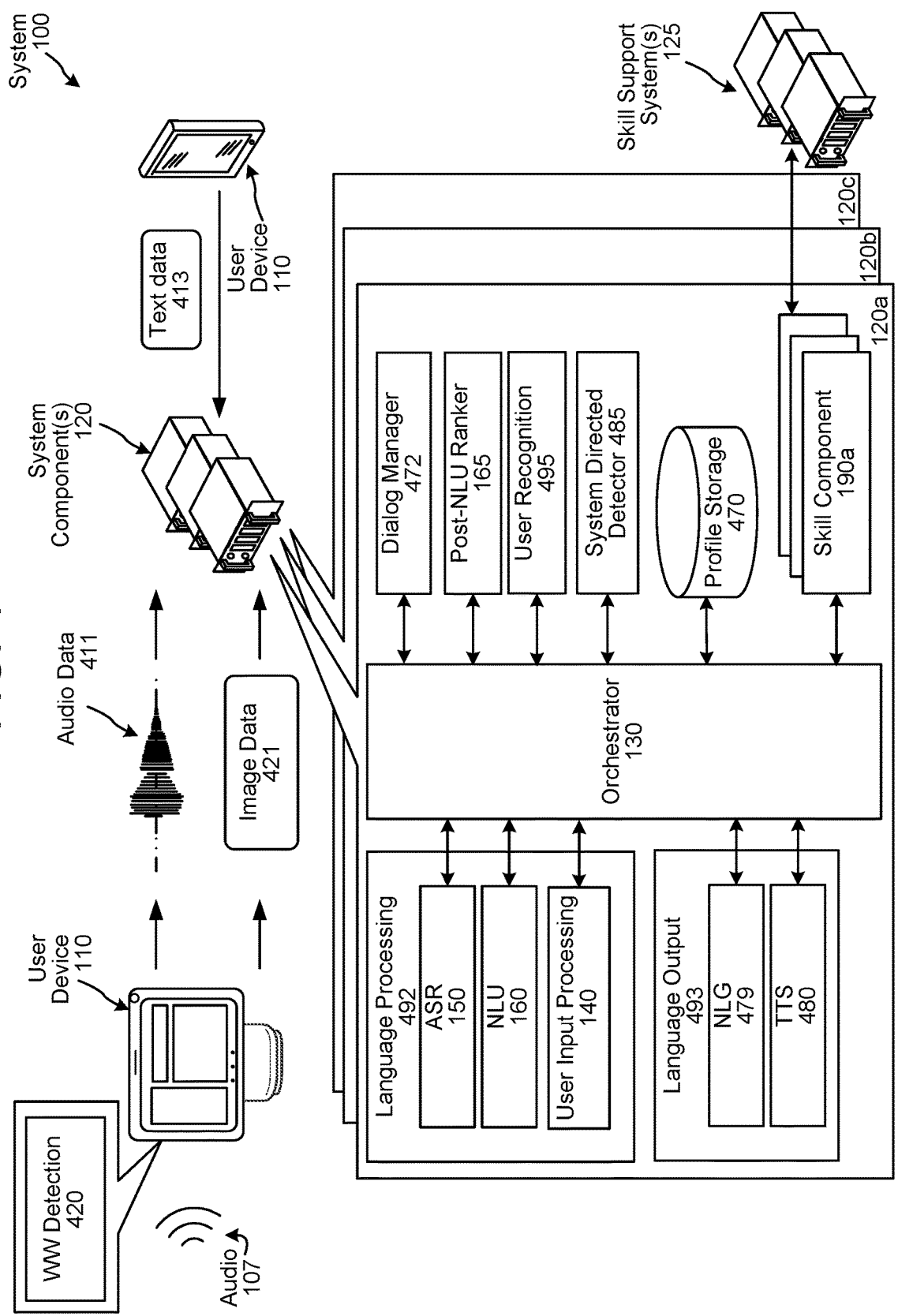
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 420.

The wakeword detection component 420 may process the audio data, representing the audio 107, to determine whether speech is represented therein. The user device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword. Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech can include other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420, the user device 110 may "wake" and begin transmitting audio data 411 (shown in FIGS. 4 and 5), representing the audio 107, to the system component(s) 120. The audio data 411 may include data corresponding to the wakeword.

The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data 421 representing those image(s) to the system component(s) 120. The image data 421 may include raw image data or image data processed by the device 110 before sending to the system component(s) 120. The image data 421 may be used in various manners by different components of the system to perform operations such as determining whether a user is directing an utterance to the system, interpreting a user command, responding to a user command, etc.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 420 and/or input is detected by an input detector, the device 110 may "wake" and begin transmitting audio data 411, representing the audio 107, to the system component(s) 120. The audio data 411 may include data corresponding to the wakeword; in other embodiments, the portion of the audio corresponding to the wakeword is removed by the device 110 prior to sending the audio data 411 to the system component(s) 120. In the case of touch input detection- or gesture-based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 190 of one or more system components 120.

The system component(s) 120 may include a system directed input detector 485. The system directed input detector 485 may be configured to determine whether an input to the system (for example speech, a gesture, etc.) is directed to the system or not directed to the system (for example directed to another user, etc.). The system directed input detector 485 may work in conjunction with the wakeword detector 420. If the system directed input detector 485 determines an input is directed to the system, the device 110 may "wake" and begin sending captured data for further processing (for example, processing audio data using the language processing 492/592, processing captured image data 421, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 485 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 485 is determining whether an input is potentially device directed. For example, the system may output an orange indicator while considering an input, and may output a green indicator if a system directed input is detected. Other such configurations are possible.

Upon receipt by the system component(s) 120, the audio data 411 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 411 to a language processing component 492. The language processing component 492 (sometimes also referred to as a spoken language understanding (SLU) component) includes an automatic speech recognition (ASR) component 150 and a natural language understanding (NLU) component 160. The ASR component 150 may transcribe the audio data 411 into text data, tokenized data or other word representation data. The ASR data output by the ASR component 150 represents one or more than one (e.g., in the form of an N-best list) ASR hypotheses representing speech represented in the audio data 411.

In some embodiments, the ASR component 150 interprets the speech in the audio data 411 based on a similarity between the audio data 411 and pre-established language models. For example, the ASR component 150 may compare the audio data 411 with models for sounds (e.g., acoustic units such as phonemes, senons, phones, etc.) and sequences of sounds to identify words that match the sequence of sounds of the speech represented in the audio data 411. In some embodiments, the ASR component 150 may use one or more machine learning models, for example, neural network models, RNN models, RNN-T models, etc. The ASR component 150 sends the ASR data generated thereby to an NLU component 160, via, in some embodiments, the orchestrator component 130. The ASR data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein.

The speech processing system 492 may further include a NLU component 160. The NLU component 160 may receive the ASR data from the ASR component 150. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill support system(s) 125, etc.) to execute the intent. For example, if the ASR data corresponds to "play the 5th Symphony by Beethoven," the NLU component 160 may determine an intent that the system output music and may identify "Beethoven" as an artist/composer and "5th Symphony" as the piece of music to be played. For further example, if the ASR data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 105. However, if the NLU component 160 is unable to resolve the entity—for example, because the entity is referred to by anaphora such as "this song" or "my next appointment"—the speech processing system 492 can send a decode request to another speech processing system 492 for information regarding the entity mention and/or other context related to the utterance. The speech processing system 492 may augment, correct, or base results data upon the audio data 411 as well as any data received from the other speech processing system 492.

The NLU component 160 may return NLU results data (which may include tagged text data, indicators of intent, etc.) back to the orchestrator component 130. The orchestrator component 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 165 which may incorporate other information to rank potential interpretations determined by the NLU component 160. The local device 110 may also include its own post-NLU ranker 565, which may operate similarly to the post-NLU ranker 165.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator component 130.

The post-NLU ranker 165 may include a statistical component that produces a ranked list of intent/skill pairs with associated confidence scores. Each confidence score may indicate an adequacy of the skill's execution of the intent with respect to NLU results data associated with the skill. The post-NLU ranker 165 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 165. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 165 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 165 (or other scheduling component such as orchestrator component 130) may solicit the first skill and the second skill to provide potential result data based on the first NLU hypothesis and the second NLU hypothesis, respectively. For example, the post-NLU ranker 165 may send the first NLU hypothesis to the first skill 190a along with a request for the first skill 190a to at least partially execute with respect to the first NLU hypothesis. The post-NLU ranker 165 may also send the second NLU hypothesis to the second skill 190b along with a request for the second skill 190b to at least partially execute with respect to the second NLU hypothesis. The post-NLU ranker 165 receives, from the first skill 190a, first result data generated from the first skill 190a's execution with respect to the first NLU hypothesis. The post-NLU ranker 165 also receives, from the second skill 190b, second results data generated from the second skill 190b's execution with respect to the second NLU hypothesis.

The post-NLU ranker 165 may consider the first skill result data and the second skill result data to alter the first confidence score and the second confidence score of the first NLU hypothesis and the second NLU hypothesis, respectively. That is, the post-NLU ranker 165 may generate a third confidence score based on the first result data and the first confidence score. The third confidence score may correspond to how likely the post-NLU ranker 165 determines the first skill will correctly respond to the user input. The post-NLU ranker 165 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 165 may also consider the other data to generate the third confidence score and the fourth confidence score. While it has been described that the post-NLU ranker 165 may alter the confidence scores associated with first and second NLU hypotheses, one skilled in the art will appreciate that the post-NLU ranker 165 may alter the confidence scores of more than two NLU hypotheses. The post-NLU ranker 165 may select the result data associated with the skill 190 with the highest altered confidence score to be the data output in response to the current user input. The post-NLU ranker 165 may also consider the ASR output data to alter the NLU hypotheses confidence scores.

The orchestrator component 130 may, prior to sending the NLU results data to the post-NLU ranker 165, associate intents in the NLU hypotheses with skills 190. For example, if a NLU hypothesis includes a<PlayMusic> intent, the orchestrator component 130 may associate the NLU hypothesis with one or more skills 190 that can execute the <PlayMusic> intent. Thus, the orchestrator component 130 may send the NLU results data, including NLU hypotheses paired with skills 190, to the post-NLU ranker 165. In response to ASR output data corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 165 queries each skill 190, paired with a NLU hypothesis in the NLU output data, to provide skill result data based on the NLU hypothesis with which it is associated. That is, with respect to each skill, the post-NLU ranker 165 colloquially asks each skill "if given this NLU hypothesis, what would you do with it." According to the above example, the post-NLU ranker 165 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 165 may query each of the skills 190 in parallel or substantially in parallel.

A skill 190 may provide the post-NLU ranker 165 with various data and indications in response to the post-NLU ranker 165 soliciting the skill 190 for result data. A skill 190 may simply provide the post-NLU ranker 165 with an indication of whether or not the skill can execute with respect to the NLU hypothesis it received. A skill 190 may also or alternatively provide the post-NLU ranker 165 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 165 with result data indicating slots of a framework that the skill 190 further needs filled or entities that the skill 190 further needs resolved prior to the skill 190 being able to provided result data responsive to the user input. The skill 190 may also provide the post-NLU ranker 165 with an instruction and/or computer-generated speech indicating how the skill 190 recommends the system solicit further information needed by the skill 190. The skill 190 may further provide the post-NLU ranker 165 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 165 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator The post-NLU ranker 165 uses the result data provided by the skills 190 to alter the NLU confidence scores. That is, the post-NLU ranker 165 uses the result data provided by the queried skills 190 to create larger differences between the NLU confidence scores generated by the NLU component 160. Without the post-NLU ranker 165, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 165, the system may not be able to determine whether to obtain output data from a general reference information skill or a medical information skill in response to a user input corresponding to "what is acne."

The post-NLU ranker 165 may prefer skills 190 that provide result data responsive to NLU hypotheses over skills 190 that provide result data corresponding to an indication that further information is needed, as well as skills 190 that provide result data indicating they can provide multiple responses to received NLU hypotheses. For example, the post-NLU ranker 165 may generate a first score for a first skill 190a that is greater than the first skill's NLU confidence score based on the first skill 190a providing result data including a response to a NLU hypothesis. For further example, the post-NLU ranker 165 may generate a second score for a second skill 190b that is less than the second skill's NLU confidence score based on the second skill 190b providing result data indicating further information is needed for the second skill 190b to provide a response to a NLU hypothesis. Yet further, for example, the post-NLU ranker 165 may generate a third score for a third skill 190c that is less than the third skill's NLU confidence score based on the third skill 190c providing result data indicating the third skill 190c can provide multiple responses to a NLU hypothesis.

The post-NLU ranker 165 may consider other data in determining scores. The other data may include rankings associated with the queried skills 190. A ranking may be a system ranking or a user-specific ranking. A ranking may indicate a veracity of a skill from the perspective of one or more users of the system. For example, the post-NLU ranker 165 may generate a first score for a first skill 190a that is greater than the first skill's NLU processing confidence score based on the first skill 190a being associated with a high ranking. For further example, the post-NLU ranker 165 may generate a second score for a second skill 190b that is less than the second skill's NLU processing confidence score based on the second skill 190b being associated with a low ranking.

The other data may include information indicating whether or not the user that originated the user input has enabled one or more of the queried skills 190. For example, the post-NLU ranker 165 may generate a first score for a first skill 190a that is greater than the first skill's NLU processing confidence score based on the first skill 190a being enabled by the user that originated the user input. For further example, the post-NLU ranker 165 may generate a second score for a second skill 190b that is less than the second skill's NLU processing confidence score based on the second skill 190b not being enabled by the user that originated the user input. When the post-NLU ranker 165 receives the NLU results data, the post-NLU ranker 165 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 165 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 165 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 165 may increase the NLU processing confidence score associated with a first skill 190a corresponding to a room service skill associated with the hotel and/or decrease the NLU processing confidence score associated with a second skill 190b corresponding to a food skill not associated with the hotel.

The other data may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 165 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 165 may increase the NLU processing confidence score associated with the second skill 190b and/or decrease the NLU processing confidence score associated with the first skill 190a.

The other data may include information indicating a time of day. The system may be configured with skills 190 that operate with respect to certain times of day. For example, a user may provide a user input corresponding to "order me food." A first skill 190a may generate first result data corresponding to breakfast. A second skill 190b may generate second result data corresponding to dinner. If the system(s) 120 receives the user input in the morning, the post-NLU ranker 165 may increase the NLU processing confidence score associated with the first skill 190a and/or decrease the NLU processing score associated with the second skill 190b. If the system(s) 120 receives the user input in the afternoon or evening, the post-NLU ranker 165 may increase the NLU processing confidence score associated with the second skill 190b and/or decrease the NLU processing confidence score associated with the first skill 190a.

The other data may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 470) that is associated with the user that provided the user input to the system components(s) 120 as well as indicates the user prefers the first skill 190a over the second skill 190b. Thus, when the user provides a user input that may be executed by both the first skill 190a and the second skill 190b, the post-NLU ranker 165 may increase the NLU processing confidence score associated with the first skill 190*a* and/or decrease the NLU processing confidence score associated with the second skill 190*b*.

The other data may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 165 may increase the NLU processing confidence score associated with the first skill 190*a* and/or decrease the NLU processing confidence score associated with the second skill 190*b*.

It has been described that the post-NLU ranker 165 uses the other data to increase and decrease NLU confidence scores associated with various skills 190 that the post-NLU ranker 165 has already requested result data from. Alternatively, the post-NLU ranker 165 may use the other data to determine which skills 190 to request result data from. For example, the post-NLU ranker 165 may use the other data to increase and/or decrease NLU processing confidence scores associated with skills 190 associated with the NLU results data output by the NLU component 160. The post-NLU ranker 165 may select n-number of top scoring altered NLU processing confidence scores. The post-NLU ranker 165 may then request result data from only the skills 190 associated with the selected n-number of NLU processing confidence scores.

As described, the post-NLU ranker 165 queries multiple skills associated with the NLU results data to provide result data to the post-NLU ranker 165 prior to the post-NLU ranker 165 ultimately determining the skill 190 to be invoked to respond to the user input. Some of the skills 190 may provide result data indicating responses to NLU hypotheses while other skills 190 may providing result data indicating the skills cannot provide responsive data. Whereas a system not implementing the post-NLU ranker 165 may select one of the skills 190 that could not provide a response, the post-NLU ranker 165 only selects a skill 190 that provides the post-NLU ranker 165 with result data corresponding to a response, indicating further information is needed, or indicating multiple responses can be generated.

The post-NLU ranker 165 may select result data, associated with the skill 190 associated with the highest score, for output to the user. Alternatively, the post-NLU ranker 165 may output ranked output data indicating skills 190 and their respective post-NLU ranker rankings. Since the post-NLU ranker 165 receives result data, potentially corresponding to a response to the user input, from the skills 190 prior to post-NLU ranker 165 selecting one of the skills or outputting the ranked output data, little to no latency occurs from the time skills provide result data and the time the system outputs responds to the user.

If the post-NLU ranker 165 selects result audio data to be output to a user and the system determines content should be output audibly, the post-NLU ranker 165 (or another component of the system(s) 120) may cause the device 110*a* and/or the device 110*b* to output audio corresponding to the result audio data. If the post-NLU ranker 165 selects result text data to output to a user and the system determines content should be output visually, the post-NLU ranker 165 (or another component of the system(s) 120) may cause the device 110*b* to display text corresponding to the result text data. If the post-NLU ranker 165 selects result audio data to output to a user and the system determines content should be output visually, the post-NLU ranker 165 (or another component of the system(s) 120) may send the result audio data to the ASR component 150. The ASR component 150 may generate output text data corresponding to the result audio data. The system(s) 120 may then cause the device 110*b* to display text corresponding to the output text data. If the post-NLU ranker 165 selects result text data to output to a user and the system determines content should be output audibly, the post-NLU ranker 165 (or another component of the system(s) 120) may send the result text data to the TTS component 480. The TTS component 480 may generate output audio data (corresponding to computer-generated speech) based on the result text data. The system(s) 120 may then cause the device 110*a* and/or the device 110*b* to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 472 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 472 may associate a dialog session identifier with the dialog upon identifying that the user is engaging in a dialog with the user. The dialog manager component 472 may track a user input and the corresponding system generated response to the user input as a turn. The dialog session identifier may correspond to multiple turns of user input and corresponding system generated response. The dialog manager component 472 may transmit data identified by the dialog session identifier directly to the orchestrator component 130 or other component. Depending on system configuration the dialog manager 472 may determine the appropriate system generated response to give to a particular utterance or user input of a turn. Or creation of the system generated response may be managed by another component of the system (e.g., the language output component 493, NLG 479, orchestrator component 130, etc.) while the dialog manager 472 selects the appropriate responses. Alternatively, another component of the system component(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 472 may receive the ASR hypothesis/hypotheses (i.e., text data) and make a semantic interpretation of the phrase(s) or statement(s) represented therein. That is, the dialog manager 472 determines one or more meanings associated with the phrase(s) or statement(s) represented in the text data based on words represented in the text data. The dialog manager 472 determines a goal corresponding to an action that a user desires be performed as well as pieces of the text data that allow a device (e.g., the device 110, the system component(s) 120, a skill 190, a skill support system(s) 125, etc.) to execute the intent. If, for example, the text data corresponds to "what is the weather," the dialog manager 472 may determine that that the system component(s) 120 is to output weather information associated with a geographic location of the device 110. In another example, if the text data corresponds to "turn off the lights," the dialog manager 472 may determine that the system component(s) 120 is to turn off lights associated with the device(s) 110 or the user(s) 105.

The dialog manager 472 may send the results data to one or more skill component(s) 190. If the results data includes a single hypothesis, the orchestrator component 130 may send the results data to the skill component(s) 190 associated with the hypothesis. If the results data includes an N-best list of hypotheses, the orchestrator component 130 may send the top scoring hypothesis to a skill component(s) 190 associated with the top scoring hypothesis.

The system component(s) 120 includes a language output component 493. The language output component 493 includes a natural language generation (NLG) component 479 and a text-to-speech (TTS) component 180. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480. Alternatively or in addition, the TTS component 480 may receive text data from a skill component 190 or other system component for output.

The NLG component 479 may include a trained model. The NLG component 479 generates text data (or other natural language representation data) from dialog data received by the dialog manager 472 such that the output text data has a natural feel and, in some embodiments, includes words and/or phrases specifically formatted for a requesting individual. The NLG component 479 may use templates to formulate responses, and/or the NLG component 479 may include models trained from the various templates for forming the output text data. For example, the NLG component 479 may analyze transcripts of local news programs, television shows, sporting events, or any other media program to obtain common components of a relevant language and/or region. As one illustrative example, the NLG component 479 may analyze a transcription of a regional sports program to determine commonly used words or phrases for describing scores or other sporting news for a particular region. The NLG component 479 may further receive, as inputs, a dialog history, an indicator of a level of formality, and/or a command history or other user history such as the dialog history.

The NLG component 479 may generate dialog data based on one or more response templates. Further continuing the example above, the NLG component 479 may select a template in response to the question, "What is the weather currently like?" of the form: "The weather currently is $weather_information$." The NLG component 479 may analyze the logical form of the template to produce one or more textual responses including markups and annotations to familiarize the response that is generated. In some embodiments, the NLG component 479 may determine which response is the most appropriate response to be selected. The selection may, therefore, be based on past responses, past questions, a level of formality, and/or any other feature, or any other combination thereof. Responsive audio data representing the response generated by the NLG component 479 may then be generated using the text-to-speech component 480.

The TTS component 480 may generate audio data (e.g., synthesized speech) from text data using one or more different methods. Text data input to the TTS component 480 may come from a skill component 190, the orchestrator component 130, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 411 representing the commands to the system component(s) 120 for processing, after which the system component(s) 120 may return output data that can cause the device 110 to engage its camera.

Upon receipt by the system component(s) 120, the image data 421 may be sent to an orchestrator component 130. The orchestrator component 130 may send the image data 421 to an image processing component that can perform computer vision functions such as object recognition, modeling, reconstruction, etc. For example, the image processing component may detect a person, face, etc. (which may then be identified using user recognition component 495). The device 110 may also include its own image processing component.

In some implementations, the image processing component can detect the presence of text in an image. In such implementations, the image processing component can recognize the presence of text, convert the image data to text data, and send the resulting text data via the orchestrator component 130 to the language processing component 492 for processing by the NLU component 160.

The system component(s) 120 may include a user recognition component 495 that recognizes one or more users using a variety of data. However, the disclosure is not limited thereto, and the device 110 may include a user recognition component 595 instead of and/or in addition to user recognition component 495 of the system component(s) 120 without departing from the disclosure. User recognition component 595 operates similarly to user recognition component 495.

The user-recognition component 495 may take as input the audio data 411 and/or text data output by the ASR component 150. The user-recognition component 495 may perform user recognition by comparing audio characteristics in the audio data 411 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 5:
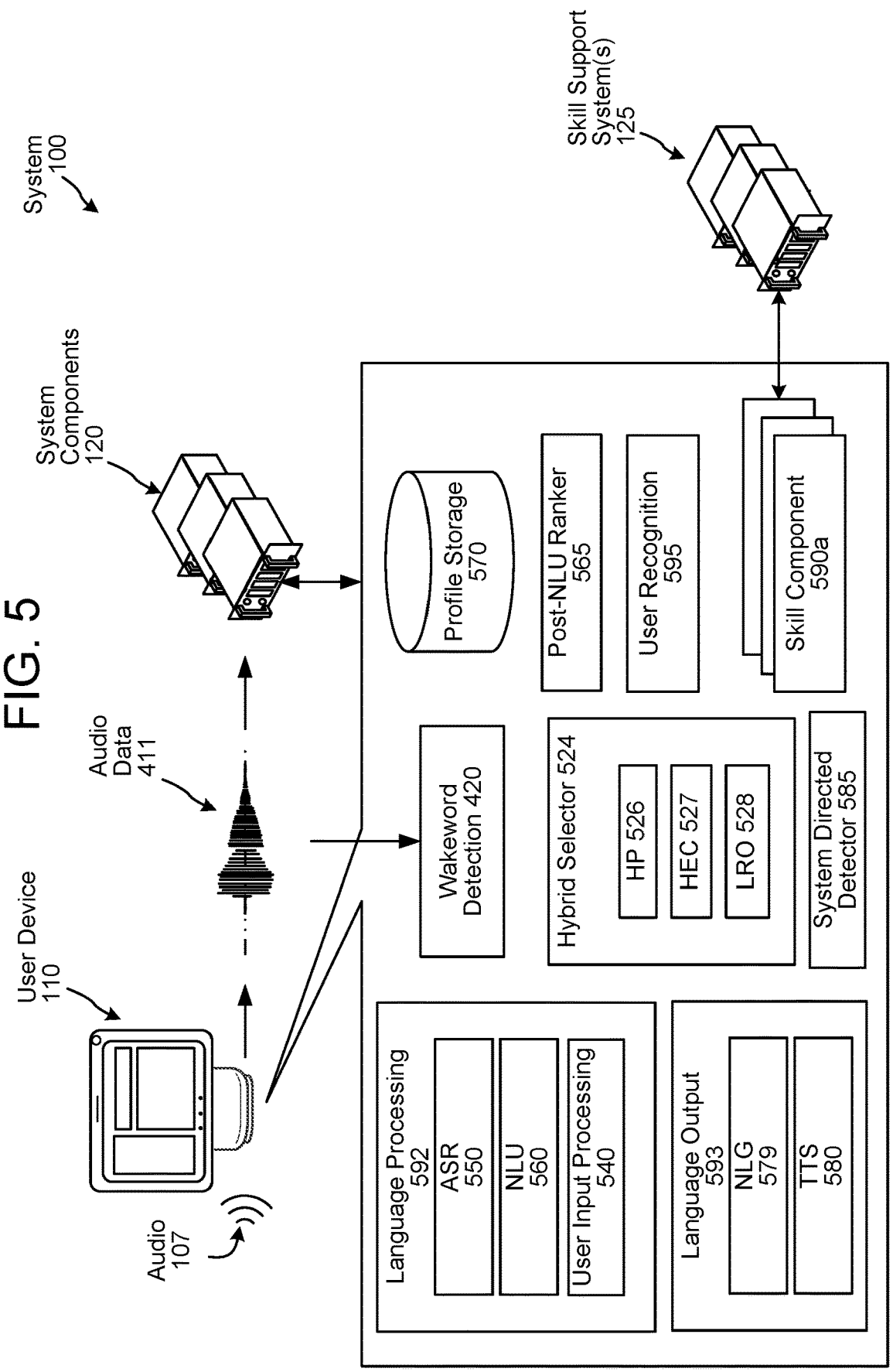
FIG. 5 is a conceptual diagram illustrating components that may be included in a device, according to embodiments of the present disclosure.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 411 from the device 110, to recognize speech corresponding to a spoken input in the received audio data 411, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIGS. 1A-1B, the device 110 may include a wakeword detection component 420 configured to compare the audio data 411 to stored models used to detect a wakeword (e.g., "Alexa") that indicates to the device 110 that the audio data 411 is to be processed for determining NLU output data (e.g., slot data that corresponds to a named entity, label data, and/or intent data, etc.). In at least some embodiments, a hybrid selector 524, of the device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 120, and may prevent the ASR component 550 from further processing the audio data 411. In this situation, the audio data 411 can be discarded.

The device 110 may conduct its own speech processing using on-device language processing components, such as an SLU/language processing component 592 (which may include an ASR component 550 and an NLU component 560 and a user input processing component 540), similar to the manner discussed herein with respect to the SLU component 492 (or ASR component 150 and the NLU component 160 and the user input processing component 140) of the system component(s) 120. Language processing component 592 may operate similarly to language processing component 492, ASR component 550 may operate similarly to ASR component 150 and NLU component 560 may operate similarly to NLU component 160 and the user input processing component 540 may operate similarly to the user input processing component 140. The device 110 may also internally include, or otherwise have access to, other components such as one or more skill components 590 capable of executing commands based on NLU output data or other results determined by the device 110/system component(s) 120 (which may operate similarly to skill components 190), a user recognition component 595 (configured to process in a similar manner to that discussed herein with respect to the user recognition component 495 of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the device 110. Similar to as described above with respect to skill component 190, a skill component 590 may communicate with a skill support system(s) 125. The device 110 may also have its own language output component 593 which may include NLG component 579 and TTS component 580. Language output component 593 may operate similarly to language output component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 524, of the device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 411 to pass to the system component(s) 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 411 is received, the HP 526 may allow the audio data 411 to pass through to the system component(s) 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system component(s) 120 or the local language processing components. However, the disclosure is not limited thereto, and in some examples the hybrid selector 524 may send the audio data 411 only to the local ASR component 550 without departing from the disclosure. For example, the device 110 may process the audio data 411 locally without sending the audio data 411 to the system component(s) 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 411 to the system component(s) 120, and the response data from the system component(s) 120 may include the unique identifier to identify which natural language user input the response data corresponds.

In at least some embodiments, the device 110 may include, or be configured to use, one or more skill components 590 that may work similarly to the skill component(s) 190 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125.

Similar to the manner discussed with regard to FIG. 4, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detector 420 may result in sending audio data to certain language processing components 592/skills 590 for processing while detection of the wakeword "Computer" by the wakeword detector may result in sending audio data different language processing components 592/skills 590 for processing.

One or more of the herein described system component(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 6:
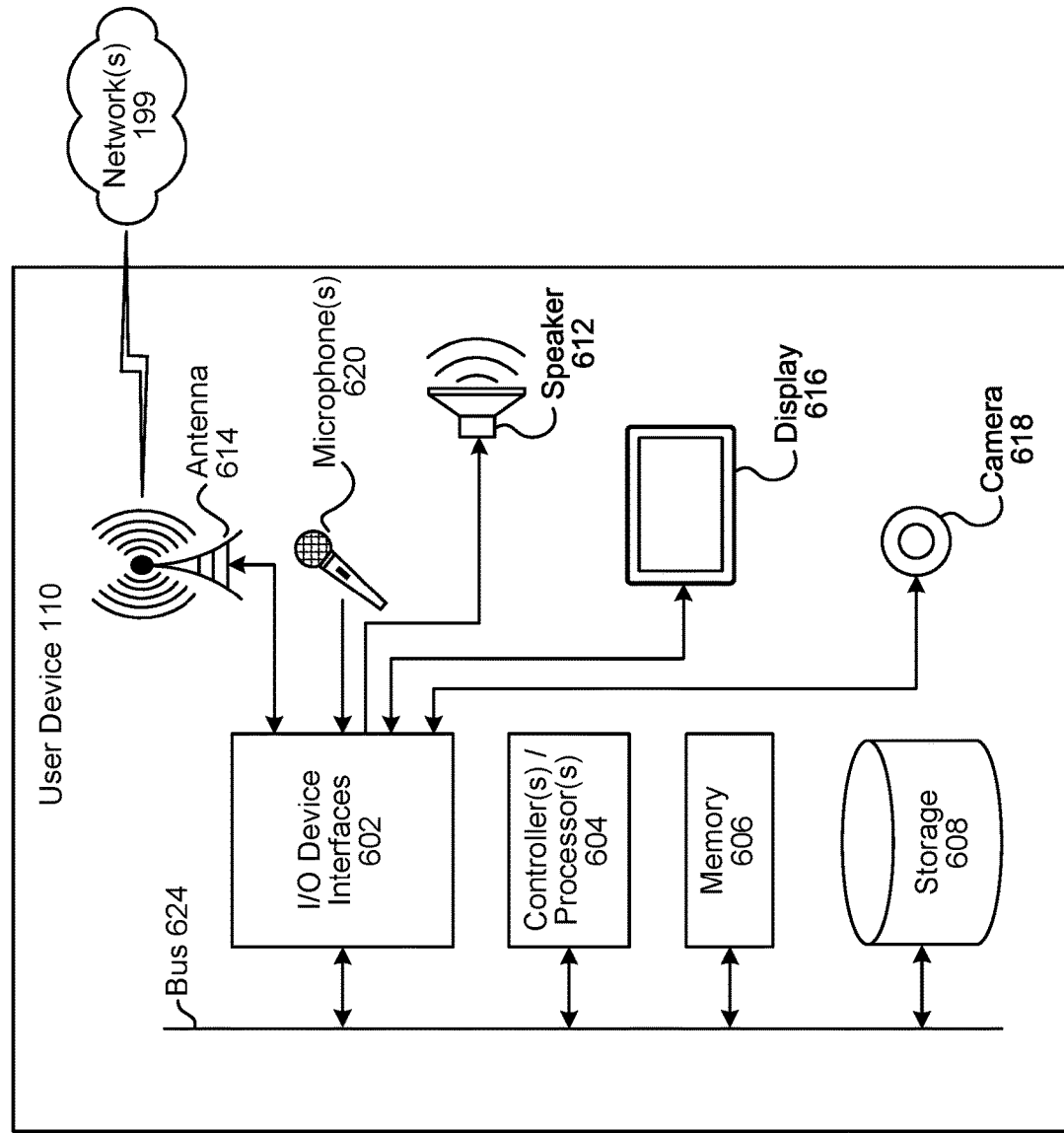
FIG. 6 is a block diagram conceptually illustrating example components of a device according to embodiments of the present disclosure.
Figure 7:
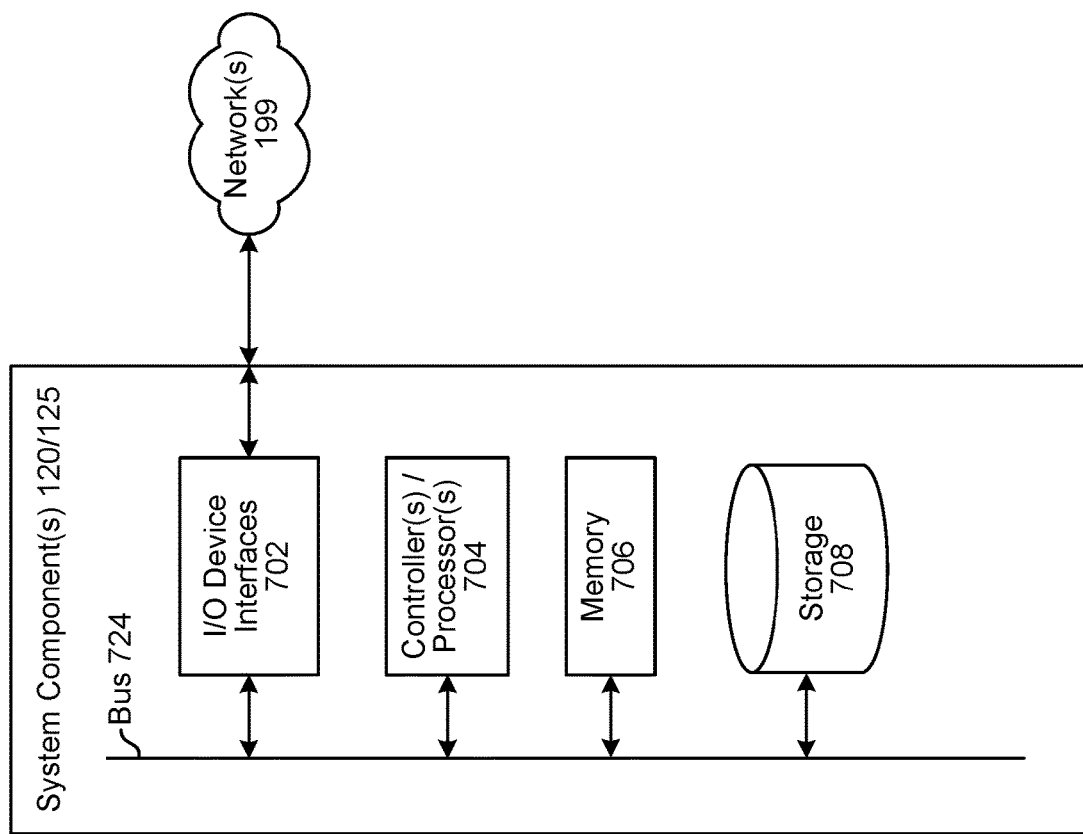
FIG. 7 is a block diagram conceptually illustrating example components of a system according to embodiments of the present disclosure.

FIG. 6 is a block diagram conceptually illustrating a device 110 that may be used with the system. FIG. 7 is a block diagram conceptually illustrating example components of a remote device, such as the system component(s) 120, which may assist with ASR processing, NLU processing, etc., and the skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more system components 120 for performing ASR processing, one or more system components 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system component(s) 120, or the skill support system(s) 125 may include their own dedicated processors, memory, and/or storage. Alternatively, one or more of the components of the device(s) 110, the system component(s) 120, or the skill support system(s) 125 may utilize the I/O interfaces (602/702), processor(s) (604/704), memory (606/706), and/or storage (608/708) of the device(s) 110 system component(s) 120, or the skill support system(s) 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 125, as described herein, are illustrative, and may be located as a stand-alone device or may be included, in whole or in part, as a component of a larger device or system.

Figure 8:
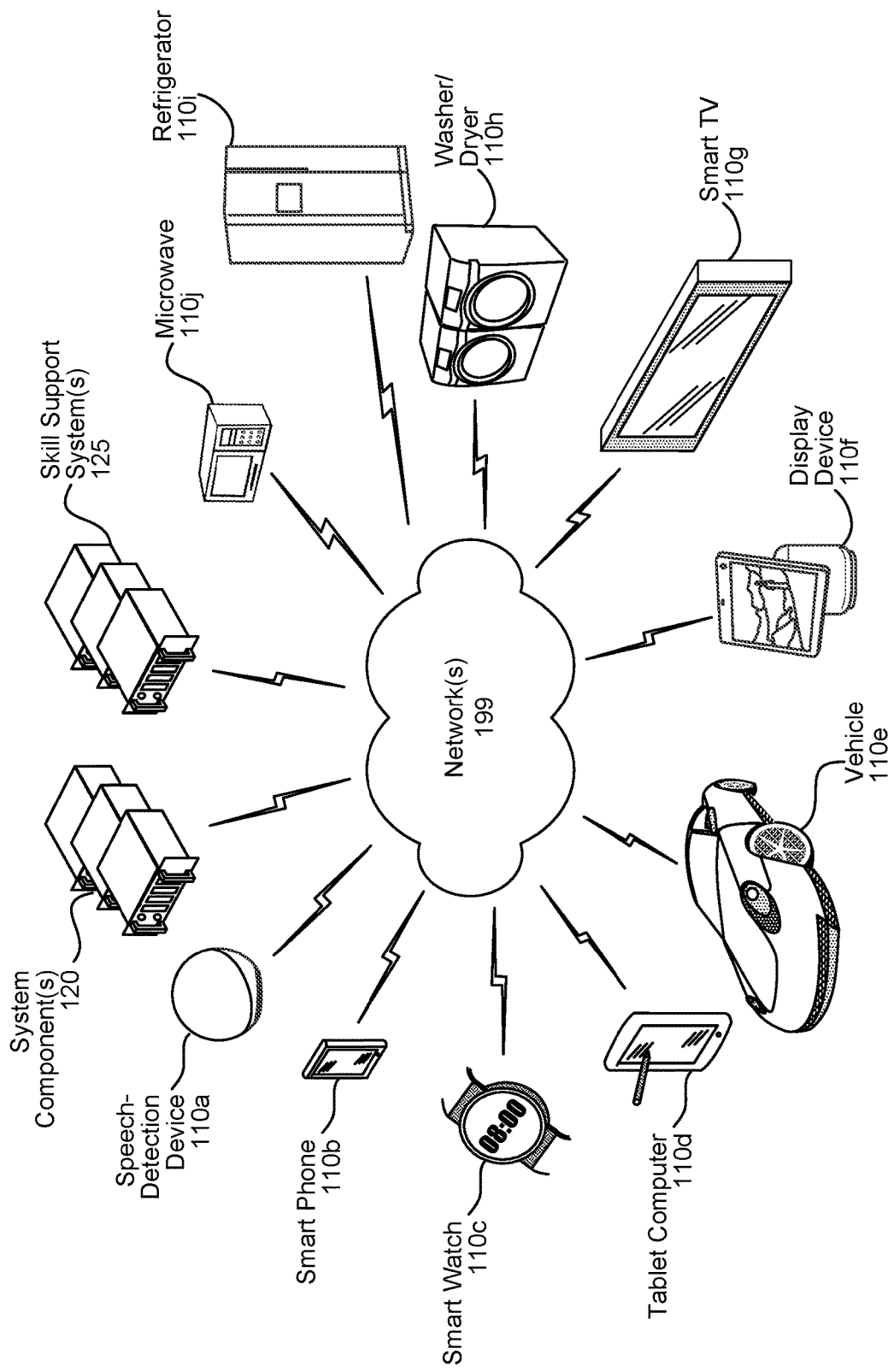
FIG. 8 illustrates an example of a computer network for use with the speech processing system.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, first audio data representing a first spoken input;
   receiving first context data representing a device type of the device, a time the first spoken input is received, and a device location;
   processing, using a language model, the first context data to determine a first task prediction corresponding to the first spoken input;
   performing automatic speech recognition (ASR) processing on the first audio data to determine first ASR data corresponding to the first spoken input;
   processing, using the language model, the first context data, the first ASR data, and the first task prediction to determine a second task prediction corresponding to the first spoken input;
   processing the first ASR data to determine an intent corresponding to the first spoken input;
   processing, using the language model, the first context data, the first ASR data, the intent, the first task prediction, and the second task prediction to determine a third task prediction corresponding to the first spoken input, wherein the third task prediction indicates a first skill component capable of performing a task responsive to the first spoken input;
   determining, using the first skill component, output data based on performance of the task; and
   causing presentation of the output data.

2. The computer-implemented method of claim 1, further comprising:
   receiving first graph data representing user preference information and historical interaction information corresponding to a user that provided the first spoken input;
   receiving second graph data representing system capability information;
   receiving third graph data representing factual knowledge information;
   processing the first graph data, the second graph data, the third graph data, and the first context data to determine first data relevant to processing with regard to the first spoken input,
   wherein processing, using the language model, to determine the first task prediction comprises processing, using the language model, the first data to determine the first task prediction;
   processing the first graph data, the second graph data, the third graph data, the first context data, and the first ASR data to determine second data relevant to processing with regard to the first spoken input,
   wherein processing, using the language model, to determine the second task prediction comprises processing, using the language model, the second data and the first task prediction; and
   processing the first graph data, the second graph data, the third graph data, the first context data, the first ASR data, and the intent to determine third data relevant for the first spoken input,
   wherein processing, using the language model, to determine the third task prediction comprises processing, using the language model, the third data and the second task prediction.

3. The computer-implemented method of claim 1, wherein the third task prediction includes a prediction score, and the method further comprises:
   processing the first ASR data to determine natural language understanding (NLU) data corresponding to the first spoken input, the NLU data indicating the intent, an entity, a second skill component capable of processing the intent and the entity and a NLU confidence score;
   determining, based at least in part on the prediction score and the NLU confidence score, that the first skill component is to be used to respond to the first spoken input; and
   in response to determining that the first skill component is to be used, determining the output data using the first skill component.

4. The computer-implemented method of claim 1, wherein the first task prediction is associated with a first confidence score and the second task prediction is associated with a second confidence score, and the method further comprises:
  determining, based at least in part on the first confidence score and the first task prediction that a first additional iteration of processing is to be performed;
  in response to determining that the first additional iteration of processing is to be performed, causing processing of the first context data, the first ASR data and the first task prediction using the language model;
  determining, based at least in part on the second confidence score and the second task prediction that a second additional iteration of processing is to be performed; and
  in response to determining that the second additional iteration of processing is to be performed, causing processing of the first context data, the first ASR data, the intent, the first task prediction and the second task prediction using the language model.

5. A computer-implemented method comprising:
  receiving first input data representing a first user input;
  receiving first context data corresponding to the first user input;
  processing, using a language model, the first context data to determine a first task prediction corresponding to the first user input;
  determining, based at least in part on the first task prediction, that a first additional iteration of processing is to be performed;
  receiving second context data corresponding to the first user input;
  in response to determining that the first additional iteration of processing is to be performed, processing, using the language model, the first context data, the second context data, and the first task prediction to determine a second task prediction corresponding to the first user input;
  using the second task prediction, determining first output data responsive to the first user input; and
  causing presentation of the first output data.

6. The computer-implemented method of claim 5, further comprising:
  receiving first graph data representing user preference information and historical interaction information for a user that provided the first user input;
  receiving second graph data representing system capability information;
  receiving third graph data representing factual knowledge information;
  processing the first graph data, the second graph data, the third graph data and the first context data to determine first data relevant for the first user input;
  processing, using the language model, the first data to determine the first task prediction;
  processing the first graph data, the second graph data, the third graph data, the first context data and the second context data to determine second data relevant for the first user input; and
  processing, using the language model, the second data and the first task prediction to determine the second task prediction.

7. The computer-implemented method of claim 6, further comprising:
  generating first prompt data representing an instruction to the language model to determine the first task prediction given the first context data and the first data;
  processing the first prompt data using the language model to determine the first task prediction;
  generating second prompt data representing an instruction to the language model to determine the second task prediction given the second context data and the second data; and
  processing the second prompt data using the language model to determine the second task prediction.

8. The computer-implemented method of claim 5, wherein the first context data represents a device type, a time the first user input is received, and a device location,
  wherein the second context data represents automatic speech recognition (ASR) data corresponding to the first user input, and
  wherein the method further comprises:
    determining, using the ASR data, natural language understanding (NLU) data corresponding to the first user input; and
    processing, using the language model, the first context data, the second context data, the NLU data and the second task prediction to determine a third task prediction corresponding to the first user input.

9. The computer-implemented method of claim 5, further comprising:
  receiving the first context data prior to processing the first input data;
  wherein processing by the language model of the first context data is in response to receiving the first context data, and
  wherein processing by the language model of the second context data is in response to determination of the second context data.

10. The computer-implemented method of claim 5, further comprising:
  determining NLU data corresponding to the first user input, the NLU data indicating a first component capable of processing with respect to the first user input;
  processing, using the language model, the first context data, the second context data, the NLU data and the second task prediction to determine a third task prediction corresponding to the first user input, the third task prediction indicating a second component capable of processing with respect to the first user input;
  determining, based at least in part on the NLU data and the third task prediction, that the second component is to be used to process with respect to the first user input; and
  using the third task prediction and the second component, determining second output data responsive to the first user input.

11. The computer-implemented method of claim 5, further comprising:
  determining the second task prediction indicating a first task representing performance of an action in response to the first user input and a second task representing a natural language output to be presented in response to the first user input.

12. The computer-implemented method of claim 5, further comprising:
  receiving second input data representing a second user input;
  receiving third context data corresponding to the second user input;

processing, using the language model, the third context data to determine a third task prediction corresponding to the second user input, the third task prediction associated with a confidence score;

determining, based at least in part on the third task prediction and the confidence score, that the third task prediction is to be used to respond to the second user input;

using the third task prediction, determining second output data responsive to the second user input; and causing presentation of the second output data.

13. A system comprising:

at least one processor; and at least one memory including instructions that, when executed by the at least one processor, cause the system to:

receive first input data representing a first user input;

receive first context data corresponding to the first user input;

process, using a language model, the first context data to determine a first task prediction corresponding to the first user input;

determine, based at least in part on the first task prediction, that a first additional iteration of processing is to be performed;

receive second context data corresponding to the first user input;

in response to determining that the first additional iteration of processing is to be performed, process, using the language model, the first context data, the second context data, and the first task prediction to determine a second task prediction corresponding to the first user input;

using the second task prediction, determine first output data responsive to the first user input; and cause presentation of the first output data.

14. The system of claim 13, wherein the instructions that, when executed by the at least one processor, cause the system to:

receive first graph data representing user preference information and historical interaction information for a user that provided the first user input;

receive second graph data representing system capability information;

receive third graph data representing factual knowledge information;

process the first graph data, the second graph data, the third graph data and the first context data to determine first data relevant for the first user input;

process, using the language model, the first data to determine the first task prediction;

process the first graph data, the second graph data, the third graph data, the first context data and the second context data to determine second data relevant for the first user input; and process, using the language model, the second data and the first task prediction to determine the second task prediction.

15. The system of claim 14, wherein the instructions that, when executed by the at least one processor, cause the system to:

generate first prompt data representing an instruction to the language model to determine the first task prediction given the first context data and the first data;

process the first prompt data using the language model to determine the first task prediction;

generate second prompt data representing an instruction to the language model to determine the second task prediction given the second context data and the second data; and process the second prompt data using the language model to determine the second task prediction.

16. The system of claim 13, wherein the first context data represents a device type, a time the first user input is received, and a device location, wherein the second context data represents automatic speech recognition (ASR) data corresponding to the first user input, and wherein the instructions that, when executed by the at least one processor, cause the system to:

determine, using the ASR data, natural language understanding (NLU) data corresponding to the first user input; and process, using the language model, the first context data, the second context data, the NLU data and the second task prediction to determine a third task prediction corresponding to the first user input.

17. The system of claim 13, wherein the instructions that, when executed by the at least one processor, further cause the system to:

receive the first context data prior to processing the first input data;

process using the language model of the first context data is in response to receiving the first context data, and process using the language model of the second context data is in response to determination of the second context data.

18. The system of claim 13, wherein the instructions that, when executed by the at least one processor, further cause the system to:

determine NLU data corresponding to the first user input, the NLU data indicating a first component capable of processing with respect to the first user input;

process, using the language model, the first context data, the second context data, the NLU data and the second task prediction to determine a third task prediction corresponding to the first user input, the third task prediction indicating a second component capable of processing with respect to the first user input;

determine, based at least in part on the NLU data and the third task prediction, that the second component is to be used to process with respect to the first user input; and using the third task prediction and the second component, determine second output data responsive to the first user input.

19. The system of claim 13, wherein the instructions that, when executed by the at least one processor, further cause the system to:

determine the second task prediction indicating a first task representing performance of an action in response to the first user input and a second task representing a natural language output to be presented in response to the first user input.

20. The system of claim 13, wherein the instructions that, when executed by the at least one processor, further cause the system to:

receive second input data representing a second user input;

receive third context data corresponding to the second user input;

process, using the language model, the third context data to determine a third task prediction corresponding to the second user input, the third task prediction associated with a confidence score;
determine, based at least in part on the third task prediction and the confidence score, that the third task prediction is to be used to respond to the second user input;
using the third task prediction, determine second output data responsive to the second user input; and
cause presentation of the second output data.

* * * * *